(12) United States Patent
Grantham et al.

(10) Patent No.: US 6,215,495 B1
(45) Date of Patent: *Apr. 10, 2001

(54) PLATFORM INDEPENDENT APPLICATION PROGRAM INTERFACE FOR INTERACTIVE 3D SCENE MANAGEMENT

(75) Inventors: Brad Grantham, Mountain View; Michael T. Jones, San Jose; Mark G. Segal, Menlo Park; Chris Tanner, San Jose; Chris Walker, Gilroy; John Rohlf, Campbell, all of CA (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,696

(22) Filed: May 30, 1997

(51) Int. Cl.[7] .............................. G06T 15/00; G06F 7/00
(52) U.S. Cl. ..................... 345/419; 707/102; 707/103 R
(58) Field of Search ................................. 345/419, 428, 345/430–432, 433, 438, 441, 467–470; 707/102, 103 R, 104, 513, 514, 103, 103 Z

(56) References Cited

U.S. PATENT DOCUMENTS

| | | | | |
|---|---|---|---|---|
| 5,764,241 | * | 6/1998 | Elliott et al. | 345/473 |
| 5,777,621 | * | 7/1998 | Schneider et al. | 345/428 |

OTHER PUBLICATIONS

"Computer Graphics: Principles and Practice" by Foley et al (pp. 734–744), 1993.*

* cited by examiner

Primary Examiner—Mark R. Powell
Assistant Examiner—Thu Nguyen
(74) Attorney, Agent, or Firm—Wagner, Murabito & Hao LLP

(57) ABSTRACT

A computer-readable medium having stored thereon an applications programming interface for causing a computer system to render a three-dimensional scene according to a downloaded file. A scene graph is constructed from a number of objects stored in memory. These objects have variables which can be changed by subroutine calls. Furthermore, one or more objects can contain one or more fields. A field is comprised of a data type which represents the state of an object. Engines are used to perform defined functions to the fields. One or more routes can be used to change one field in response to changes made to another field. A class hierarchy is defined to implement a retained mode graphics.

55 Claims, 13 Drawing Sheets

PLATFORM INDEPENDENT APPLICATION PROGRAM INTERFACE FOR INTERACTIVE 3D SCENE MANAGEMENT

FIELD OF THE INVENTION

The present invention relates to a platform independent application program interface for interactive three-dimensional scene management.

BACKGROUND OF THE INVENTION

Computer graphics is used in a wide variety of applications, such as in business, science, animation, simulation, computer-aided design, process control, electronic publication, gaming, medical diagnosis, etc. In an effort to portray a more realistic real-world representation, three dimensional objects are transformed into models having the illusion of depth for display onto a two-dimensional computer screen. This is accomplished by using a number of polygons to represent a three-dimensional object. Next, a scan conversion process is used to determine which pixels of a computer display fall within each of the specified polygons. Thereupon, texture is selectively applied to those pixels residing within specified polygons. In addition, hidden or obscured surfaces, which are normally not visible, are eliminated from view. Finally, lighting, shading, shadowing, translucency, and blending effects are applied.

For a high resolution display (1024×1024) having over a million pixels, for which values must be generated for each and every pixel, displaying a three-dimensional scene on a computer system is a rather complicated task and requires a tremendous amount of processing power. Furthermore, the computer system must be extremely fast for it to handle dynamic computer graphics for displaying three-dimensional objects that are in motion. In order to simulate motion, the computer system should have a frame rate of at least 30 hertz. In other words, new images should be updated, redrawn and displayed at least thirty times a second. Otherwise, the motion would appear to be jerky and unnatural to the human eye. Indeed, even more processing power is required for interactive computer graphics, whereby 3-D images change in response to a user input (e.g., flight simulation). And as a scene becomes "richer" by adding more details and objects, more processing computation is required to render that scene. It is an extremely complex task for a computer to render millions of pixels in order to process these amazingly complex scenes every three-tenths of a second.

Unfortunately, even though a computer might be powerful enough to render such 3-D scenes, there are practical limitations on the speed or "bandwidth" for transmitting and receiving display information over a network, such as the Internet. Due to this limited bandwidth, computers can only send and receive a relatively small trickle of information. Hence, conveying 3-D image information is excruciatingly slow, time-consuming, and frustrating for the user. As a consequence, displays on the Internet have typically been flat and two-dimensional. There are attempts underway to increase the bandwidth by employing fiber optics, wireless communications, cable networks, satellite systems, etc. However, the throughput for these high speed paths can quickly become overloaded with heavy Internet traffic.

In recognition of the limited bandwidth, a high level programming language, known as Virtual Reality Meta Language (VRML) was developed to more efficiently utilize the existing bandwidth in the transmission of 3-D image information. VRML files are formatted in such a way so that some of the 3-D display information can be intentionally left out. Thereby, VRML files can be transmitted much more quickly. This is made possible by the fact that VRML techniques rely on transmitting instructions as well as data to the user's computer. It is then up to the user's computer system to follow these instructions using its resident graphics engine and library to produce the 3-D images.

Although VRML is widely known, designing a graphics application programming interface (API) to take advantage of the powerful and extensive feature set of VRML is quite demanding. Basically, an API is comprised of a library of commands that allows a programmer to utilize the graphics hardware in a computer. It is important to design an API graphics toolkit which allows developers to readily incorporate dynamic 3D worlds, collaborative design environments, and virtual characters with spatialied and synchronized audio into their World Wide Web applications. Further complicating matters is that it would be highly desirable for such an API to be platform independent, whereby the same API allows vendor-neutral PC, workstation, and supercomputing software developers to create high-quality color images of 3-D objects which are capable of running on any of several different platforms. Hardware companies implement each library call in a way that best utilizes the graphics hardware that they provide. The API should also be designed to be network transparent and operating-system independent (i.e., capable of running on X Windows, Microsoft Windows NT™ and Windows 95™, OS/2,™ MacOS™, Irix OS™, etc.).

In designing the platform-independent API, proper and careful attention must be directed in the selection of which features and attributes are to be included (e.g., geometric morphing, view culling, levels of detail, 3-D audio, texture mapping, modeling, transformation, color, NURBS, fog, alpha blending, smooth shading, motion blur, etc.). Furthermore, the definition of a scene graph containing geometry, sound, and a transformation hierarchy dramatically impacts how efficiently an object can be rendered. In particular, the method of performing graphics state management affects the speed at which 3-D objects can be rendered. Other factors to be considered include rendering optimizations; intersection and pick testing; fields and engines; and data and method extensibility. In addition, the API should be designed with the goal towards minimizing the amount of memory that is consumed for storage. Thus, designing a VRML compliant 3-D graphics API that is efficient, platform-independent, and interactive for rendering high quality 3-D objects is a non-trivial task and demands a thorough understanding, extensive experience, and intimate knowledge of 3-D computer graphics.

SUMMARY OF THE INVENTION

The present invention pertains to a platform independent application programming interface for interactive three-dimensional scene management. In particular, the applications programming interface is used to render a three-dimensional scene according to a downloaded file. This is accomplished by building a scene graph from a number of objects which are stored in local memory. These objects have variables which can be changed by subroutine calls. Furthermore, one or more objects can contain one or more fields. A field is comprised of a data type which represents the state of that particular object. Engines are used to perform defined functions to the fields. One or more routes can be used to change one field in response to changes made to another field.

In the currently preferred embodiment, a class hierarchy is defined to more efficiently generate and render the scene graph. The topmost level of class hierarchy is comprised of Context, Action, Field Specification, and Base classes. The context class maintains the graphics state for a particular graphics context. The Action class performs traversals. The FieldSpec class describes the fields of a Base class. It defines the field specification for a class by listing the types of all fields that a class instance contains. The Base class represents the base class for objects containing fields. The Base class can include other classes, such as the Clock, Color, Appearance, Node, Material, Texture, Texture Transform, and Geometry classes. In turn each of these classes can be subdivided into further classes. For instance, the Node class can include a Group, Viewport, Light, Fog, Sound, and Shape class. It is this unique combination of class hierarchy, related fields, and their associated set and get functions which makes the API of the present invention so powerful.

BRIEF DESCRIPTION OF THE DRAWINGS

The operation of this invention can be best visualized by reference to the drawings.

DETAILED DESCRIPTION

A platform independent application program interface for interactive three-dimensional scene management is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
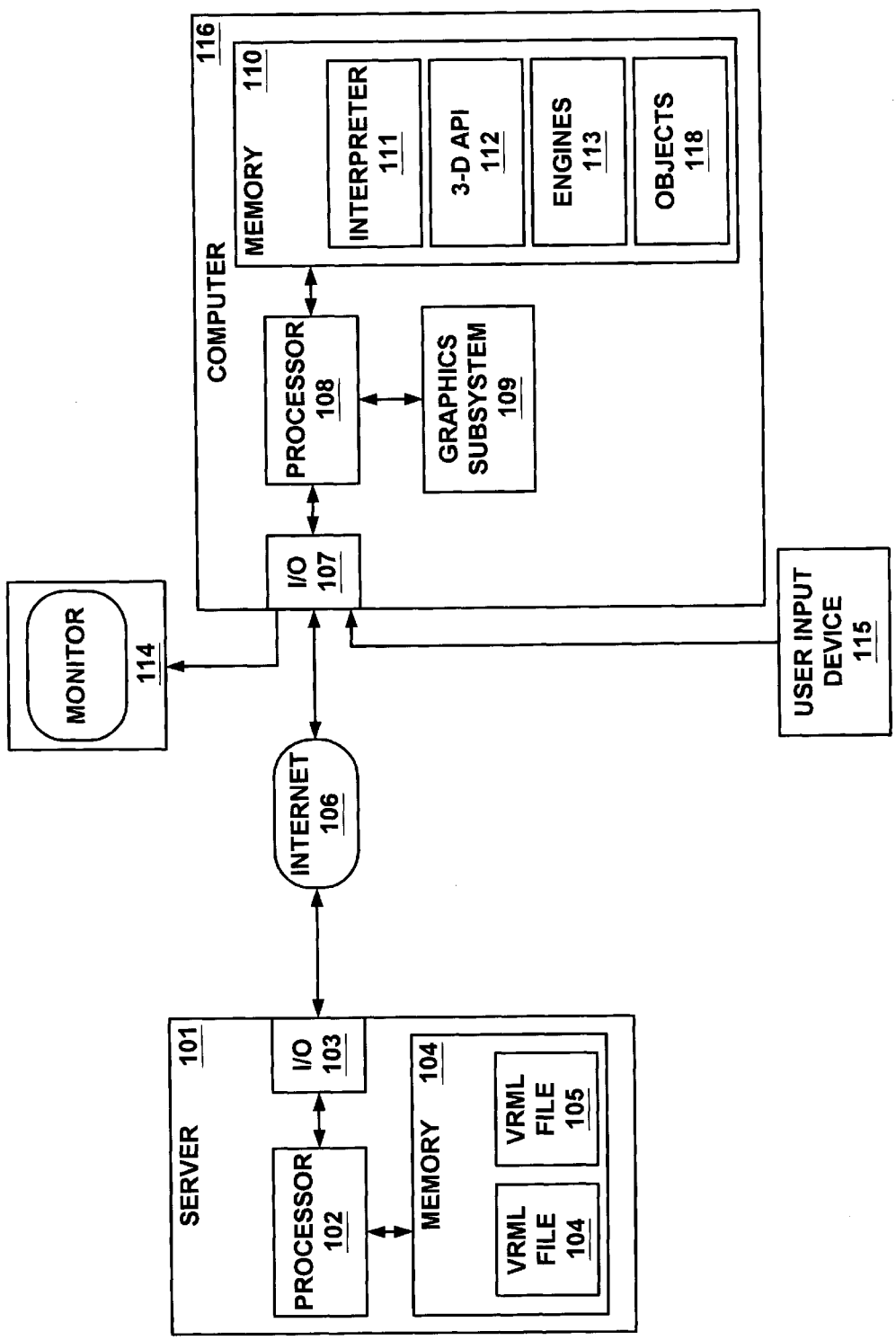
FIG. 1 shows a computer system upon which the present invention may be practiced.

Referring to FIG. 1, a computer system upon which the present invention may be practiced is shown. Initially, an original 3-D scene is created and described in a VRML file format by a programmer. The programmer describes both the components of the scene (e.g., geometry, materials, lights, images, movies, and sounds) as well as the relationships among those components. These relationships may be static (e.g., a transformation hierarchy) or dynamic (e.g., the values of transformations in the hierarchy). Changes in one element of the scene may be made to effect changes in others. For instance, a change in the position of a light-bulb shaped geometry can be made to cause a change in the position of a light source. In addition, information about the locations and characteristics of viewpoints may be included in the scene. Once created, the VRML files 104 and 105 are stored in the memory 104 of server 101. It should be noted that although the present invention is described with reference to the VRML 2.0 file format, it is not limited to the VRML file format and may be used to describe, view, and interact with scenes described in virtually any format.

In the currently preferred embodiment, a retained mode graphics model is adopted. Basically, in a retained mode graphics model, a number of persistent data objects 118, as defined by the programmer, are stored in the local memory 110 of a computer system 116. These persistent objects 118 represent the basic building blocks used to construct a scene graph. A scene graph is a directed acyclic graph (DAG) of nodes which represent a database. Scene graphs may also be referred to as hierarchies and portions of a scene graph are called subgraphs. Nodes which have children are called groups or internal nodes and nodes which cannot have children are called leaves and are found at the bottom of the scene graph. Usually, groups selectively traverse one or more of their children (i.e., they are switches) or define some state, for example a transformation, which affects all their descendants. Such state is said to be inherited by the descendants of the group node. Inherited state may be cumulative, (e.g., transformations), or not. Leaf nodes in the scene graph typically contain renderable objects, (e.g., sound or geometry), and inherited state affects how they are rendered. For example, the inherited transformation positions sound and geometry in the world. The inherited state in effect at a leaf node is determined by a traversal which visits all nodes on the path from the root of the traversal to the leaf node, accumulating inherited state along the way. Different traversals are defined for different actions, such as rendering and intersecting. The structures which initiate traversals and which maintain traversal state are called actions. Since it is accumulated with a traversal, inherited state is also referred to as traversal state. In practice, applications will build a scene graph, instantiate a DrawAction, and apply( ) it to the root of the scene graph in order to draw it.

The data objects consist of geometry, graphics state, transformation hierarchy, and audio information. By storing these persistent data objects in the computer's local memory the server is saved from having to re-transmit this type of data each and every time a new scene graph is to be constructed. Furthermore, persistent data objects not only facilitate simple high-level control of a 3D scene, but also allow many general and platform-specific optimizations to be advantageously exploited.

Thereby, a user browsing the Internet on computer system 116 (e.g., personal computer, workstation, etc.) can access the web site supported by server 101 and have 3-D scene graphs rendered for display on his or her computer screen 114. This is accomplished by processor 108 of computer system 116 initiating a request which is routed by input/output (I/O) device 107 through the Internet 106 to server 101. When server 101 receives such a request, processor 102 retrieves the appropriate VRML file from memory 104. The VRML file is then transmitted back over the Internet 106 by I/O device 103. The VRML file instructs the API 112 to make a number of function calls to the various graphics engines 113 for performing desired functions on the persistent data objects 118. An interpreter 111 may then be used to modify the scene graph to suit the specific graphics subsystem hardware 109 found in computer system 116. Hence, interpreter 111 enables the VRML file to be adapted to run on virtually any type of machine. The scene graph is finally rendered for display onto monitor 114 by graphics subsystem 109. Optionally, the user may choose to edit the 3-D scene by inputting specific commands via input device 115 (e.g., a keyboard, mouse, joystick, lightpen, etc.). The user may also interact with the 3D scene (e.g., flight simulation, game playing, etc.) through user input device 115.

One of the keys to constructing the scene graph with optimal speed and quality relates to how the API is structured. In the present invention, the API is structured as a collection of class hierarchies. There are classes for the nodes that make up the scene graph (e.g., csGroup), the data objects that embody the graphics state (e.g., csMaterial), and the means for assembling the nodes and graphics states into a cohesive scene graph. The specific classes, their associated state(s), and their operation(s) are critical factors in determining the overall efficiency by which a 3D graphic scene can be constructed and which are described in detail below.

Figure 2:
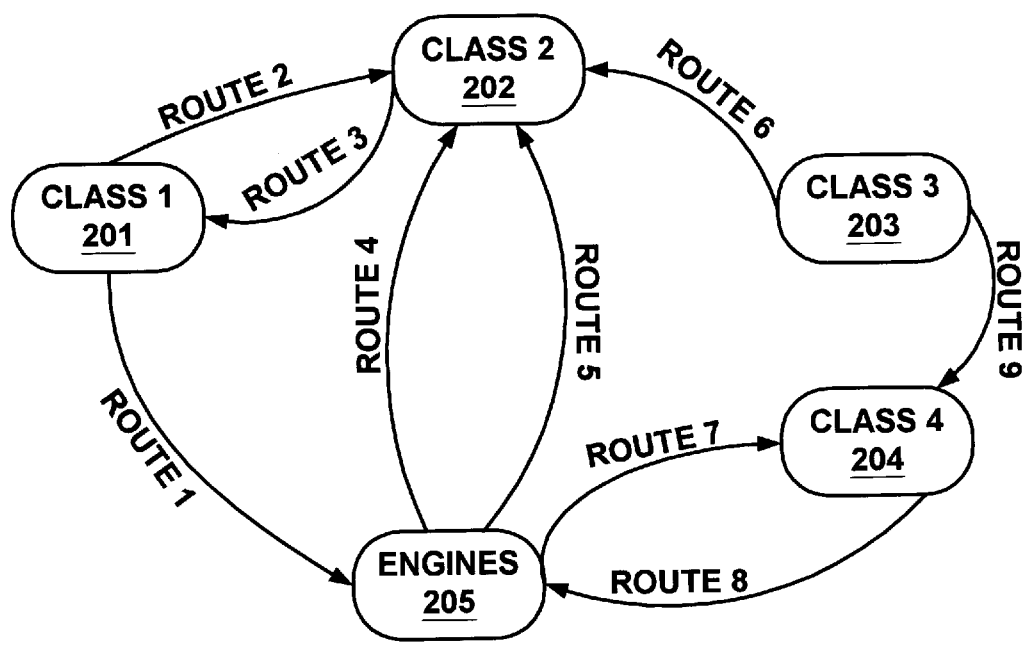
FIG. 2 shows the procedural interfaces between a number of classes, engines, and their respective routes.

Referring to FIG. 2, the procedural interfaces between a number of classes 201–204 and engines 205 is shown. Classes 201–204 represent data objects and methods. In turn, many of the data objects have one or more fields. A field is an attribute of an object that can be connected either to other fields or to engines 205 for creating animations or other effects within the scene graph. It represents a data type (e.g., float, vectors, and arrays). Fields define the persistent state of an object; only an object's fields are read from and written to a file. They also define the finest granularity at which an object can be modified. A field may have multiple outputs as well as multiple inputs. A field with multiple inputs will have the value of its most recently changed input. Another attribute of an object is its variables, which may be changed through method calls but cannot be connected to engines or other fields. Together, the fields and variables define the state of an object as stored in a file or database. The fields may be connected or routed to each other, so that the setting of one field automatically updates all of its connected fields to the same value. For example, route 1 connects a field in class 201 to the engines 205; route 2 connects a field in class 201 to a field in class 202; route 3 connects a field in class 203 to a field in class 201, route 4 connects the engines 205 to a field in class 202; etc. Engines 205 are objects with zero or more input and output fields that may be connected to other engine inputs and/or object fields. When an input field changes, an engine evaluates a built-in or user-defined function and updates its output fields accordingly. Engines 205 may be connected together into higher function networks for simulating complex behaviors.

Figure 3:
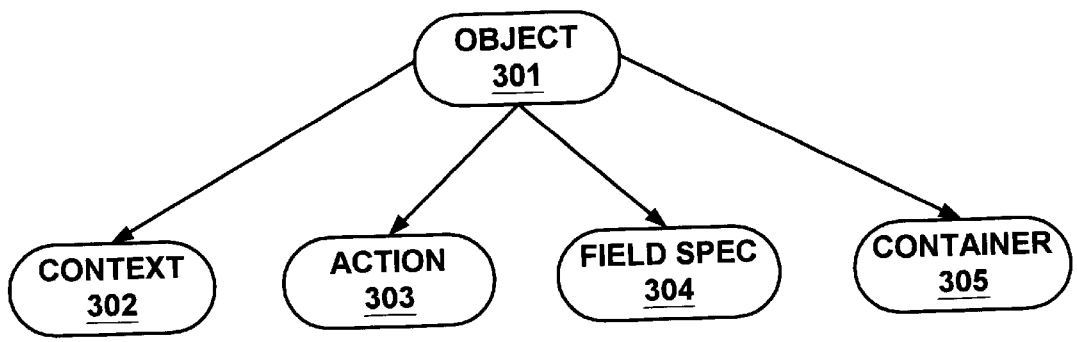
FIG. 3 illustrates the top-level class hierarchy for an object.

FIG. 3 illustrates the top-level class hierarchy for an object. An object 301 is characterized by four classes: Context 302, Action 303, FieldSpec 304, and Base 305. Each of these classes and their respective constructors, data, and functions are now described in detail. First, the Context class 302 maintains the graphics state for a particular graphics context. More specifically, the graphics state is maintained in a stack of Appearances, allowing pushing and popping of graphics state. The top of the Appearance stack, Gfx, describes the state of the underlying rendering engine and modifications to Gfx directly affects the state of the rendering engine, providing an immediate mode mechanism for changing graphics state.

Multiple graphics contexts are allowed, although only a single Context may be "selected" at any one time and it is referenced by Cxt. The Context class 302 has the following characteristics.

```
Constructors:
    Context( )
Static Data:
    static final Appearance Gfx
    static final Context Cxt
Static Functions:
    static void   push( )
    static void   pop( )
    static void   flush( )
Other Functions:
    void          select( )
```

The Action class 303 performs traversals. It extends objects with the following constructors and functions:

```
Constructors:
    protected Action( )
Set and Get Functions:
    void setXform(Matrix xform)
    void getXform(Matrix xform)
    void multXform(Matrix xform)
    int setSwitchVal( )
    void getSwitchVal( )
    Node[ ] getPath( )
Other Functions:
    void apply(Node node)
    void resume(Node node)
    void apply(Node node[ ])
Set implicitly does a push so that when traversal of the current node is
complete, the quantity will return to its previous value.
```

The FieldSpec class 304 describes the fields of a Base class 306. It defines the field specification for a class by listing the types of all fields that a class instance contains. Each Base instance refers to a FieldSpec which is a static member of the instance's class. Thus, type information is associated with each Base instance and accessed through Base.getFieldSpec( ). The Constructors and functions are listed below:

```
Constructors:
    FieldSpec(Class class, FieldSpec parent, FieldType fieldTypes[ ])
Set and Get Functions:
    int      getFieldCount( )
    Class    getClass( )
    FieldSpec getAncestor( )
    FieldType getFieldType(int index)
    FieldId  getFieldId(String str)
Other Functions:
    FieldId lookUpField(String name)
```

The Base class 305 represents the base class for objects containing fields. Base class 305 also provides a string name, user data pointer and the ability to keep track of its parents. Each class derived from Base has a static FieldSpec which is essentially a list of FieldTypes which describe all the fields contained by an instance of the class.

```
Fields:
    String name " "
    Object userData NULL
Static Data:
    Permissions:
        static final int READ_ENABLED =0x1
        static final int WRITE_ENABLED =0x2
Constructors:
    protected Base(FieldSpec fspec)
Field Sets and Gets:
    void       setName(String name)
    String     getName( )
    void       setUserData(object obj)
    Object     getUserData( )
Other Sets and Gets:
    FieldSpec getFieldspec( )
    int        getParentCount( )
    Base       getParent(int i)
    FieldId    getFieldId(String str)
    Field      getField(String str)
    Field      getField(FieldId id)
    void       setFieldPermissions(FieldId f, int perm)
    int        getFieldPermissions(FieldId)
    void       setPermissions(int perm)
    int        getPermissions( )
Other Functions:
    void       connect(FieldId inField, Base out, FieldId outField)
    void       disconnect(FieldId inField)
    void       isect(RayIsectAction action)
    void       draw(RenderAction action)
    void       draw( )
    protected void addParent(Base base)
    protected int removeParent(Base base)
```

Figure 4:
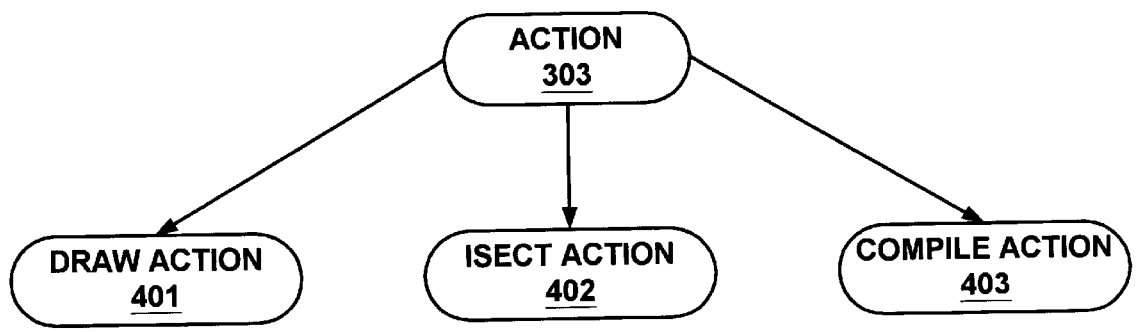
FIG. 4 illustrates the classes associated with the Action class.

FIG. 4 illustrates the classes associated with the Action class. The first class is DrawAction 401, which is used to draw a scene. It has the following characteristics.

```
Constructors:
    DrawAction( )
Set and Get Functions:
    void setCamera(Camera cam)
    Camera getCamera( )
    void setViewport(Viewport view)
    Viewport getViewport( )
    void getViewpoint(Vec3f view)
    void getFrustum(Frustum frust)
```

The viewpoint, frustum and culling volume are returned in object coordinates based on the current transformation accumulated during traversal.

The IsectAction class 402 intersects with a scene. Its constructor is IsectAction( ). Finally, the CompileAction class 403 compiles a specified subgraph into a data structure which is more efficient for traversals. Compilation is directed by CompileAction modes and the read/write permissions of objects and their fields. Compiled portions of the scene graph are opaque to the application and specifics of compilation (memory usage, CPU cost) are implementation-dependent.

```
Constructors:
    CompileAction( )
Set and Get Functions:
    void       setPermissionMask(int mask)
    int        getPermissionMask( )
```

Figure 5:
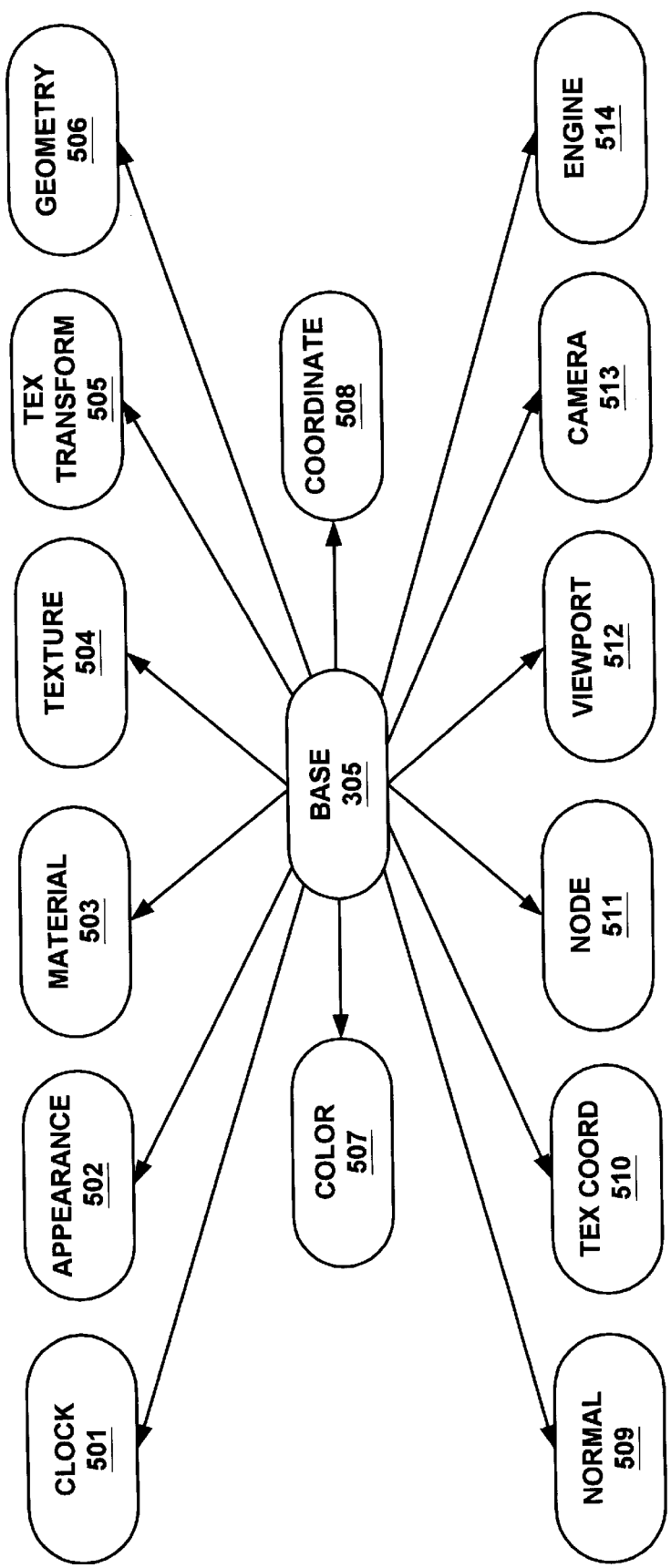
FIG. 5 illustrates the classes associated with the Base class.

FIG. 5 illustrates the classes associated with the Base class. In the currently preferred embodiment, the Container class 403 has the following fourteen classes: Clock 501, Appearance 502, Material 503, Texture 504, TexTransform 505, Geometry 506, Color 507, Coordinate 508, Normal 509, TexCoord 510, Node 511, Viewport 512, Camera 513, and Engine 514. The Clock class 501 provides a time source having the following criteria:

```
Fields:
    float rate 1.0
    double time 0.0
    boolean enable FALSE
Constructors:
    Clock( )
    protected Clock(FieldSpec fspec)
Static Functions:
    static double getRealTime( )
Field Sets and Gets:
    double     getTime( )
    void       setTime(double time)
    float      getRate( )
    void       setRate(float rate)
    boolean    getEnable( )
    void       setEnable(boolean enable)
Other Functions:
    double     getOffset( )
Construction:
    When constructed, the fields are set to their default values..
Field Descriptions:
    The rate field defines how fast the clock runs compared with the
    real-time clock.
    The time field contains the clock's current time.
    The enable field specifies whether the clock is running or paused.
    Disabling a clock causes it to stop and retain its current time.
    Enabling a clock causes it to resume from its current time value.
Function Descriptions:
    getRealTime( ) returns the current real time. The real time is
    guaranteed not to decrease and not to wrap, but the initial value and
    resolution of the real time clock may vary between implementations.
    getOffset( ) returns the current time difference between this clock and
    the real time clock.
```

The class Appearance 502 encapsulates the graphics modes and attributes (collectively called state elements) used for rendering geometry; it defines geometry's appearance. For example, an Appearance may reference a rippled Texture, a shiny Material, a TexTransform, and enable transparency (e.g., to define the appearance of a lake's surface). All these state elements then interact with the normals, colors, and texture coordinates of the object's (e.g., lake's) geometry to simulate a more realistic-looking scene (e.g., water). The most common use of an Appearance is to associate it with Geometry in a Shape node that is part of a scene graph. The paradigm is that the lighting, texturing and other visual cues of Appearance give "shape" to otherwise flat-shaded Geometry. However, Appearances may also be drawn directly by a program without any associated geometry to support immediate mode rendering of geometry by a program. The Appearance state may either be locally set or globally inherited. By default, all Appearance state elements are inherited from the global default until explicitly set. The global state is configured by modifying the top of the Appearance stack maintained by the current GfxContext. If all state elements are locally set, then an Appearance becomes a full graphics context since all state is defined at the Appearance level. In the currently preferred embodiment, most of the state information is inherited from global default values and only those state elements which are expected to change often are explicitly set. Some examples of useful global defaults include Fog and Transparency (usually OFF). Highly variable state is likely to be limited to a small set like textures and materials. Furthermore, minimizing the number of locally-specified state elements simplifies databases and can improve rendering performance. The state is pushed before, and popped after Appearances are drawn so that Appearances do not inherit state from each other. As a result, Appearance rendering is order-independent. The Global state is set by modifying the top of the Appearance stack in the currently selected Context. An Appearance's inheritance of state elements may be explicitly specified with a BitMask. A state element is identified by a static final int which defines its bit position in the BitNask, (e.g., the texture state element is the Appearance). A TEXTUREth bit in the BitMask and a state element is inherited when its bit is set in the inherit mask.

```
Fields:
    BitMask     inherit      ~0
    Texture     texture      NULL (VRML)
    TexTransform texTransform NULL (VRML)
    boolean     texEnable    ON
    short       texMode      FAST
    Vec4f       texBlendcolor 1 1 1 1
    short       texEnv       FAST
    boolean     texGenEnable OFF
    TexGen      texGen       NULL
    boolean     lightEnable  ON
    Material    material     NULL (VRML)
    short       shadeModel   GOURAUD
    boolean     transpEnable OFF
    short       transpMode   FAST
    float       fogScale     OFF
    short       polyMode     FILL
    short       alphaFunc
    short       alphaRef
    Vec4f       blendColor
    short       srcBlendFunc
    short       dstBlendFunc
    int         colorMask
    short       depthFunc
    int         depthMask
Static Data:
    Enables:
    static final int  OFF = 0
    static final int  ON =1
    Texture Modes:
    static final int  FAST =1
    static final int  NICE =2
    static final int  NON_PERSP =3
    static final int  PERSP =4
    Transparency Modes:
    static final int  FAST    =1
    static final int  NICE    =2
    static final int  BLEND   =3
    static final int  SCREEN_DOOR =4
    Polygon Modes:
    static final int  FILL  =0
    static final int  LINE  =1
    static final int  POINT =2
    State Element Identifiers:
    static final int  TEX_EANBLE  =0
    static final int  TEX_MODE    =1
    static final int  TEX_TRANSFORM =2
    static final int  TEX_BLEND_COLOR =3
    static final int  TEX_ENV     =4
    static final int  TEX_GEN_ENABLE =5
    static final int  TEX_GEN     =6
    static final int  LIGHT_ENABLE =7
    static final int  MATERIAL    =8
    static final int  SHADE_MODEL =9
    static final int  TRANSP_ENABLE =10
    static final int  TRANSP_MODE =11
    static final int  FOG_SCALE   =12
    static final int  POLY_MODE   =13
    static final int  ALPHA_FUNC  =14
    static final int  ALPHA_REF   =15
    static final int  BLEND_COLOR =16
    static final int  SRC_BLEND_FUNC =17
    static final int  DST_BLEND_FUNC =18
    static final int  COLOR_MASK  =19
```

-continued

```
    static final int  DEPTH_MASK  =20
    static final int  DEPTH_FUNC  =21
Constructors:
    Appearance( )
    protected Appearance(FieldSpec fspec, int numStateElts)
Set and Get Functions:
    void     setInherit(BitMask mask)
    void     getInherit(BitMask mask)
    void     setTexEnable(boolean texEnable)
    boolean  getTexEnable( )
    void     setTexMode(short texMode)
    short    getTexMode( )
    void     setTexture(Texture texture)
    Texture  getTexture( )
    void     setTexTransform(TexTransform texture)
    TexTransform getTexTransform( )
    void     setTexBlendColor(Vec4f texBlendColor)
    Vec4f    getTexBlendColor( )
    void     setTexEnv(short texEnv)
    short    getTexEnv( )
    void     setTexGenEnableBoolean texGenEnable)
    boolean  getTexGenEnable( )
    void     setTexGen(TexGen texGen)
    TexGen   getTexGen( )
    void     setLightEnable(boolean lightEnable)
    boolean  getLightEnable( )
    void     setMaterial(Material material)
    Material getMaterial( )
    void     setShadeModel(short shadeModel)
    short    getShadeModel( )
    void     setTranspEnableBoolean transpEnable)
    boolean  getTranspEnable( )
    void     setTranspMode(short transpMode)
    short    getTranspMode( )
    void     setFogScale(float fogScale)
    float    getFogScale( )
    void     setPolyMode(short polyMode)
    short    getPolyMode( )
    void     setAlphaFunc(short alphaFunc)
    short    getAlphaFunc( )
    void     setAlphaRef(short alphaRef)
    short    getAlphaRef( )
    void     setBlendColor(Vec4f blendColor)
    Vec4f    getBlendColor( )
    void     setSrcBlendFunc(short srcBlendFunc)
    short    getSrcBlendFunc( )
    void     setDstBlendFunc(short dstBlendFunc)
    short    getDstBlendFunc( )
    void     setColorMask(int colorMask)
    int      getColorMask( )
    void     setDepthFunc(short depthFunc)
    short    getDepthFunc( )
    void     setDepthMask(int depthMask)
    int      getDepthMask( )
Other Functons:
    void     draw( )
```

The Material class 503 defines the light reflectance characteristics of a surface and has the following fields, constructors and functions.

```
Fields:
    float ambientIntensity  0.2       (VRML)
    Vec3f diffuseColor  0.8 0.8 0.8   (VRML)
    Vec3f specularColor 0 0 0         (VRML)
    Vec3f emissiveColor 0 0 0         (VRML)
    float shininess     0.2    (VRML)
    float transparency  0      (VRML)
    short ambientIndex   0
    short diffuseIndex   0
    short specularIndex  0
Constructors:
    Material( )
    protected Material(FieldSpec fspec)
```

-continued

```
Field Sets and Gets:
    void    setAmbientIntensity(float ambient)
    void    getAmbientIntensity)
    void    setDiffuseColor(float r, float g, float b)
    void    getDiffuseColor(Vec3f colors)
    void    setSpecularColor(float r, float g, float b)
    void    getSpecularColor(Vec3f colors)
    void    setEmissiveColor(float r, float g, float b)
    void    getEmissiveColor(Vec3f colors)
    void    setShininess(float shininess)
    void    getShininess( )
    void    setTransparency(float transparency)
    void    getTransparency( )
    void    setAmbientIndex(short amb)
    short   getAmbientIndex( )
    void    setDiffuseIndex(short diff)
    short   getDiffuseIndex( )
    void    setSpecularIndex(short spec)
    short   getSpecularIndex( )
Other Functions:
    void    draw( )
```

The Texture class 504 defines an image which may be applied to a surface for increased realism. Texture also defines how the image is repeated across a surface and how it is filtered.

```
Fields:
    String filename    " "      (VRML)
    Image image    0 0 0        (VRML)
    int    format    FAST
    boolean repeatS    TRUE     (VRML)
    boolean repeatT    TRUE     (VRML)
    int    minFilter    FAST
    int    magFilter    FAST
    int    source    IMAGE
Static Data:
    Formats and Filters:
    static final int FAST
    static final int NICE
    Filters:
    static final int NEAREST
    static final int LINEAR
    static final int NEAREST_MIPMAP_NEAREST
    static final int LINEAR_MIPMAP_NEAREST
    static final int LINEAR_MIPMAP_LINEAR
    Formats:
    static final int RGB_5
    static final int RGB_8
    static final int I_8
    static final int I_16
    static final int IA_8
    static final int IA_16
    Source:
    static final int IMAGE
    static final int FRAMEBUFFER
    static final int PLAYER
Constructors:
    Texture( )
    protected Texture(FieldSpec fspec)
Set and Get Functions:
    void setFilename(String file)
    void getFilename(String file)
    void setImage(Image image)
    Image getImage( )
    void setFormat(int format)
    int getFormat( )
    void setRepeatS(int repeat)
    int getRepeatS( )
    void setRepeatT(int repeat)
    int getRepeatT( )
    void setMinFilter(int filter)
    int getMinFilter( )
    void setMagFilter(int filter)
```

-continued

```
    int getMagFilter( )
    void setSource(int src)
    int getSource( )
Other Functions:
    void draw( )
    void load( )
    void format( )
```

The TexTransform class 505 defines a transformation matrix for texture coordinates. This matrix is not applied to a matrix stack, rather it replaces the current texture transformation matrix. Texture coordinates are transformed by the current texture matrix before being used to index the current texture map.

```
Fields:
    Vec2f translation 0 0    (VRML)
    float rotation   0       (VRML)
    Vec2f scale      1 1     (VRML)
    Vec2f center     0 0     (VRML)
    Matrix3fmatrix   1 0 0 0 1 0 0 0 0 1
Constructors:
    TexTransform( )
    protected TexTransform(FieldSpec spec)
Set and Get Functions;
    void setTranslation(float s, float t)
    void getTranslation(Vec2f trans)
    void setRotation(float angle)
    float getRotation( )
    void setScale(float s, float t)
    void getScale(Vec2f scale)
    void setCenter(float s, float t)
    void getCenter(Vec3f center)
    void setMatrix(Matrix3f mat)
    void getMatrix(Matrix3f mat)
Other Functions:
    void draw(DrawAction drawer)
    void draw( )
        The Geometry class 506 is the abstract base class for geometric
primitives. It has the following fields.
Fields:
    BoxBound    bound    [1 1 1 -1 -1 -1] (EMPTY)
```

The Color class 507 defines a set of colors. Classes from Color 507 are referenced by a GeoSet to define geometry colors. Color 507 consists of Color4*b* which represents a 4-component color (red, green, blue, and alpha) stored as bytes; Color4*f* which represents the 4-component color (red, green, blue, and alpha) stored as floats; ColorIndexb which represents a color index stored as a byte. The Coordinate class 508 consists of Coord3*f* which represents a 3-component coordinate (x, y, and z axis) stored as floats. The Normal class 509 consists of Normal3*f* which represents a 3-component normal coordinate (x, y, and z axis) stored as floats. The TexCoord class 510 consists of TexCoord2*f* which represents a 2-component texture coordinate stored as floats.

The Node class 511 is the abstract base class for objects which may be connected in a scene graph. A Node is that which may be a child of the grouping node, Group. Group is itself a Node and is described below. A Node has a bounding sphere which encompasses the geometric extent of itself and all its children.

```
Fields:
    SphereBound bound    0 0 0 -1 (empty sphere)
Constructors:
        Node( )
        protected Node(FieldSpec spec)
Field Sets and Gets:
    void getBound(Sphere sph)
    void setBound(Sphere sph)
```

The Viewport class 512 defines the portion of a graphics window which is used for rendering. The viewport origin and size are fractional values relative to the window size in pixels.

```
Fields:
    awt.Window window    NULL
    Vec2f    origin    0 0
    Vec2f    size      1 1
Constructors:
    Viewport( )
    protected Viewport(FieldSpec spec)
Field Sets and Gets;
    void       setWindow(awt.Window win)
    awt.Window getWindow( )
    void       setOrigin(Vec2f origin)
    void       getOrigin(Vec2f origin)
    void       setSize(Vec2f size)
        void       getSize(Vec2f size)
```

The camera class 513 is the abstract base class and defines the viewing parameters used when rendering. Each Camera has a position and orientation which defines the viewing coordinate system, near and far clip plane distances and an aspect ratio matching mode which defines how the Camera is adjusted to fit an aspect ratio (typically the viewport's aspect ratio).

```
Fields:
    Vec3f     position       0 0 0
    Rotation  orientation    0 0 1 0
    float     near     1
    float     far      1000
    int       aspectMode     CALC_VERT
Static Data:
    / / aspectMode
    static final int CALC_NONE = 0
    static final int CALC_VERT = 1
    static final int CALC_HORIZ = 2
Constructors:
    protected Camera(FieldSpec spec)
Field Sets and Gets:
    void    setPosition(float x, float y, float z)
    void    getPosition(Vec3f pos)
    void    setOrientation(Rotation rot)
    void    getOrientation(Rotation rot)
    void    setEulerOrientation(float head, float pitch, float roll)
    void    getEulerOrientation(Vec3f hpr)
    void    setNear(float neer)
    float   getNear( )
    void    setFar(float far)
    float   getFar( )
    void    setAspectMode(int aspect)
    int     getAspectMode( )
Other Sets and Gets:
    void    setAspect(float aspect)
    float   getAspect( )
    void    getBaseFrustum(Frustum frust)
        void    getViewFrustum(Frustum frust)
```

The Engine class 514 consists of the Morph, Interpolator, and Script classes, each of which are described in detail below.

Figure 6:
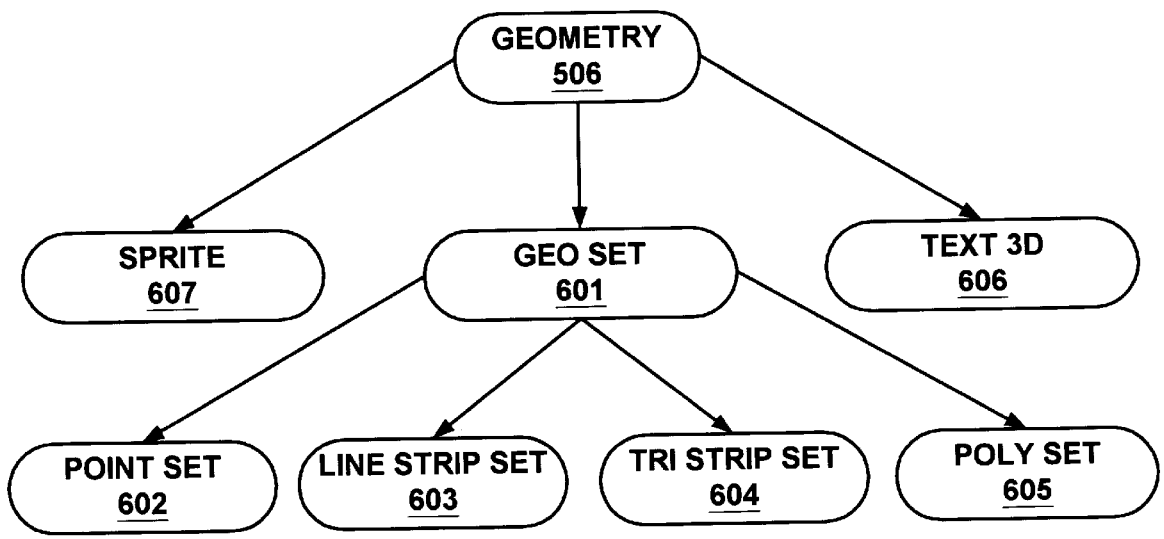
FIG. 6 illustrates the different classes associated with the Geometry class.

The Geometry 506, Color 507, Node 511, Camera 513, and Engine 514 classes themselves have associated classes. FIG. 6 illustrates the different classes associated with the Geometry class 506. Geometry class 506 has an extension, "geometry set" or GeoSet 601, which is a collection of similar primitives. GeoSet is an abstract base class; sets of specific primitives like points and lines are derived from GeoSet. A GeoSet's primitives are constructed out of arrays of attributes. In the currently preferred embodiment, the following four attributes are supported: colors, normals, texture coordinates, and coordinates. Each attribute is bound to the geometry at a specific "granularity" defined by its binding type: to the entire GeoSet, to each primitive within a GeoSet, to each primitive vertex, or not at all, corresponding to OVERALL, PER_PRIMITIVE, PER_VERTEX, or OFF, respectively. For example, a single color for each polygon in a PolySet is specified with a PER_PRIMTIVE color binding. Not all binding types are supported for each attribute. There is no binding type for coordinates since they are always specified PER_VERTEX. Allowed bindings are:

|             | OFF | OVERALL | PER_PRIMITIVE | PER_VERTEX |
|-------------|-----|---------|---------------|------------|
| colors      | yes | yes     | yes           | yes        |
| normals     | yes | yes     | yes           | yes        |
| tex coords  | yes | no      | no            | yes        |

An attribute may be indexed if an Index is specified for that attribute. Indexing allows sharing of attributes for simplified database management, reduced storage, and possibly increased performance. If no Index is specified, attributes are taken from the attribute list in sequential order 0, 1, 2, . . . etc.

```
Fields:
    short cullFace    BACK
    int primCount       0
    Color colors      NULL
    Normal normals    NULL
    TexCoord texCoords    NULL
    Coord coords      NULL
    Index colorIndices    NULL
    Index normalIndices    NULL
    Index texCoordIndices    NULL
    Index coordIndices    NULL
    char colorBind    OFF
    char normalBind    OFF
    char texCoordBind    OFF
Static Data:
    CullFace:
    static final int NONE   = 0
    static final int FRONT   = 1
    static final int BACK = 2
    static final int BOTH = 3
    Bindings:
    static final int OFF      = 0
    static final int OVERALL   = 1
    static final int PER_PRIMITIVE   = 2
    static final int PER_VERTEX   = 3
Constructors:
    protected GeoSet(FieldSpec spec)
Field Sets and Gets:
    void     setBound(Box bound)
    void     getBound(Box bound)
    void     setCullFace(int cf)
    int    getCullFace( )
    void     setPrimCount(int np)
```

-continued

```
int      getPrimCount( )
void     setColorBind(char b)
char     getColorBind( )
void     setNormalBind(char b)
char     getNormalBind( )
void     setTexCoordBind(char b)
char     getTexCoordBind( )
void     setColors(Color c)
Color    getColors( )
void     setNormals(Normal c)
Normal   getNormals( )
Void     setTexCoords(TexCoord c)
TexCoord getTexCoords( )
void     setCoords(Coord *c)
Coord    getCoords( )
void     setColorIndices(Index c)
Index    getColorIndices( )
void     setNormalIndices(Index c)
Index    getNormalIndices( )
void     setTexCoordIndices(Index c)
Index    getTexCoordIndices( )
void     setCoordIndices(Index c)
     Index    getCoordIndices( )
```

In turn, GeoSet 601 has PointSet 602, LineStripSet 603, TriStripSet 604, and PolySet 605 classes. The PointSet 602 class extends GeoSet 601 by offering a collection of equally-sized points. The point size is the diameter in pixels.

```
Fields:
    float size  1
Constructors:
    PointSet( )
    protected PointSet(FieldSpec spec)
Field Sets and Gets:
    void   serSize(size s)
    float  getSize( )
Other Functions:
    void   draw(DrawAction drawer)
    void   draw( )
```

The LineStripSet class 603 also extends GeoSet 601 by offering a collection of linestrips (otherwise known as polylines) of equal width. The line width is specified in pixels.

```
Fields:
    Index stripLengths   NULL
    float width     1
Constructors:
    LineStripSet( )
    protected LineStripSet(FieldSpec spec)
Field Sets and Gets:
    void setStripLengths(Index lengths)
    Index getStripLengths( )
    void setWidth(float width)
    float getWidth( )
Other Functions:
    void     draw(DrawAction drawer)
    void     draw( )
```

Likewise, the TriStripSet 604 extends GeoSet 601 with a collection of triangle strips.

```
Fields:
    Index stripLengths   NULL
Constructors:
    TriStripSet( )
    protected TriStripSet(FieldSpec spec)
Field Sets and Gets:
    void setStripLengths(Index lengths)
    Index getStripLengths( )
Other Functions:
    void draw(DrawAction drawer)
    void draw( )
```

In addition, the PolySet class 605 extends GeoSet with a collection of polygons. Polygons may have different numbers of sides but should be convex and coplanar.

```
Fields:
    Index polyLengths    NULL
Constructors:
    PolySet( )
    protected PolySet(FieldSpec spec)
Field Sets and Gets:
    void setPolyLengths(Index lengths)
    Index getPolyLengths( )
Other Functions:
    void   draw(DrawAction drawer)
    void   draw( )
```

A further extension is the Text3D class 606, which is an extension of the Geometry class 506. Text3D 606 enables text to be rendered three-dimensionally.

In addition, the Sprite class 607 is a rectangle which is rotated to face the viewer. When properly textured, a Sprite can realistically simulate complex objects with point or axis symmetry like clouds or trees respectively, but with far less cost than if the objects were modeled with complex geometry. A Sprite is a rectangle defined by 2 corners which are translated by the Sprite's position. The +Z axis of the Sprite's coordinate system is rotated to face the eyepoint. How this rotation is constrained defines the Sprite mode:

- ○ AXIAL: The object coordinate +Y axis is constrained to the sprite axis, defined in object coordinates. This mode is typically used for roughly cylindrical objects like trees.
- ○ POINT_EYE: The object coordinate +Y axis is constrained to the sprite axis, defined in eye coordinates. This mode is typically used to keep text upright on the screen.
- ○ POINT_OBJECT: The object coordinate +Y axis is constrained to the sprite axis, defined in object coordinates. This mode is typically used to keep clouds from rolling with the viewer.

Sprites may be given an overall normal for lighting calculations. Their color is taken from the current Material. Note that the typical usage of Sprites is to associate them with Appearances in Shape nodes.

```
Fields:
    Vec3f   bottomLeft   [-1 0 0 ]
    Vec3f   TopRight     [ 1 1 0 ]
    Vec3f   position     [ 0 0 0 ]
    Vec3f   normal       [ 0 0 1 ]
    short   mode    AXIAL
    Vec3f   axis    [ 0 1 0 ]
```

-continued

```
Static Data:
    Sprite Modes:
        static final int AXIAL       = 0
        static final int POINT_EYE   = 1
        static final int POINT_OBJECT = 2
Constructors:
        Sprite( )
        protected Sprite(FieldSpec spec)
Field Sets and Gets:
    void    setBottomLeft(float x, float y, float z)
    void    getBottomLeft(Vec3f bl)
    void    setTopRight(float x, float y, float z)
    void    getTopRight(Vec3f tr)
    void    setNormal(float x, float y, float z)
    void    getNormal(Vec3f norm)
    void    setMode(short mode)
    short   getMode( )
    void    setAxis(float x, float y, float z)
    void    getAxis(Vec3f axis)
Other Functions:
    void    draw(DrawAction drawers)
    void    draw( )
```

Figure 7:
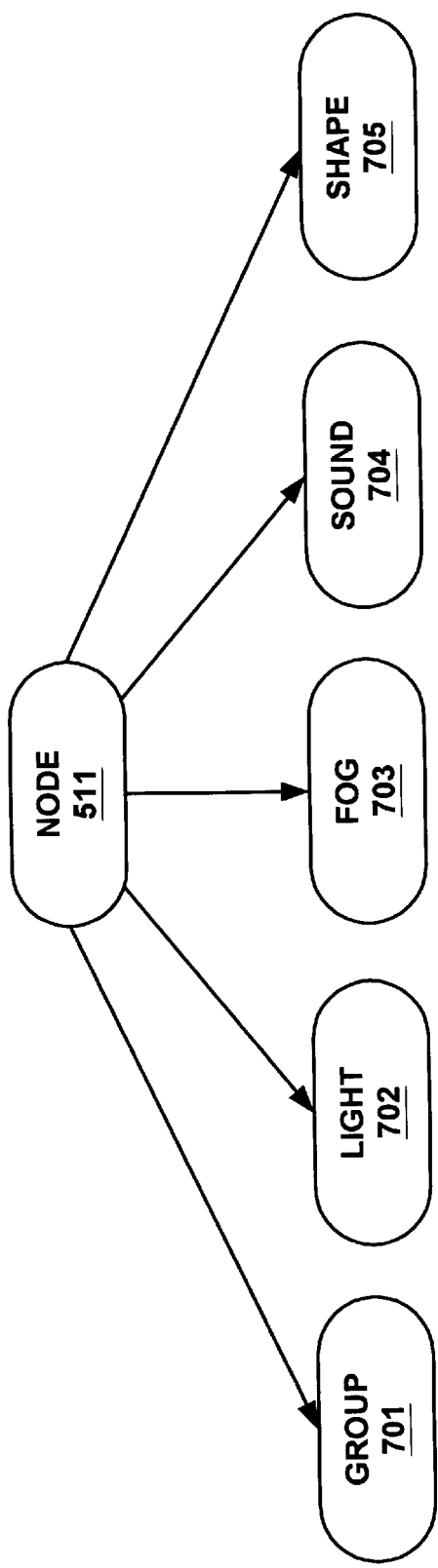
FIG. 7 illustrates the classes associated with the Node class.

FIG. 7 illustrates the classes associated with the Node class. In the currently preferred embodiment, the following five classes extend Node class 511: Group 701, Light 702, Fog 703, Sound 704, and Shape 705. The Group class 701 is a Node which may have other Nodes as children. Nodes are connected into a hierarchy or scene graph. A Node and all its children is called a subgraph. A Node may be the child of multiple Groups, in which case, it is considered to be instanced. A Node hierarchy may be used for logical or spatial grouping, or for scoping of state. The scope of state defined by subclasses of Group is restricted to the Group's children (i.e., inheritance is strictly top-down). Some states defined by Group nodes are cumulative in nature (e.g., transformations), which requires a traversal to accumulate the state. When traversing a node hierarchy, the state which is to be modified by a group node is pushed before and popped after the group's children are traversed.

```
Fields:
    NodeList children [ ] (VRML)
Constructors:
    Group( )
    protected Group(FieldSpec spec)
Field Sets and Gets:
    int addChild(Node child)
    int insertChild(int index, Node child)
    int replaceChild(Node old, Node new)
    int removeChild(Node child)
    int searchChild(Node child)
    Node getChild(int index)
    int getChildCount( )
Other Functions:
    void draw(DrawAction drawer)
```

The Light class 702 is an abstract base class for light sources. The scope of Lights 702 is defined by Environment groups. Environments may reference one or more Lights. Each Light referenced by an Environment affects all childrens of the Environment which lay within the bound of the Light. In this way, a Light may exist in one portion of the scene graph for the purposes of inheriting hierarchical state like transformation but still affect a completely different portion of the scene graph.

```
Fields:
    boolean on          TRUE (VRML)
    Float intensity       1 (VRML)
    Float ambientIntensity 0   (VRML)
    Color color          1 1 1 (VRML)
Constructors:
        Light( )
        protected Light(FieldSpec spec)
Field Sets and Gets:
    void    setOn(int on)
    int     getOn( )
    void    setIntensity(float intens)
    float   getIntensity( )
    void    setAmbientIntensity(float intens)
    float   getAmbientIntensity( )
    void    setColor(float r, float g, float b)
    void    getColor(Vec3f color)
```

The Fog class 703 defines the atmospheric attenuation of light usually caused by mist, haze, smoke or other small particles in the air. The scope of a Fog's effect is defined by each Environment group which references the Fog. All children of the Environment which lay within the Fog's bound defined by extent, an ellipsoid which is centered about location, are affected by the Fog. A Fog's bound (extent+location) is affected by any Transforms above it in the scene hierarchy. A Fog has no effect unless referenced by an Environment node.

```
Fields:
    Vec3f location     0 0 0
    Vec3f extent       1000 1000 1000   (VRML)
    float onsetRange   0
    float opaqueRange     1000.0
    Vec4f color     0.6 0.6 0.6 1
    int mode        FAST
Static Data:
    static final int FAST   = 1
    static final int NICE   = 2
    static final int LINEAR = 3
    static final int EXP    = 4
    static final int EXP2   = 5
Constructors:
        Fog( )
        protected Fog(FieldSpec spec)
Field Sets and Gets:
    void    setLocation(float x, float y, float z)
    void    getLocation(Vec3f)
    void    setExtent(float x, float y, float z)
    void    getExtent(Vec3f);
    void    setOnsetRange(float range)
    float   getOnsetRange( )
    void    setOpaqueRange(float range)
    float   getOpaqueRange( )
    void    setColor(float r, float g, float b)
    void    getColor(Vec3f)
    void    setMode(int mode)
    int     getMode( )
Other Functions:
    void    draw(DrawAction drawer)
    void    draw( )
```

The Sound class 704 represents a sound generating node and consists of the DirSound and PointSound classes. DirSound generates a directional sound, whereas PointSound generates a point sound with a local position.

The Shape class 705 is a leaf node which associates a Geometry 506 with an Appearance 502. This arrangement allows both Geometry 506 and Appearance 502 to be instanced independently.

```
Fields:
    Appearance appearance NULL (VRML)
    Geometry geometry NULL (VRML)
Constructors:
        Shape( )
    protected Shape(FieldSpec spec)
Field Sets and Gets:
    void    setAppearance(Appearance app)
    Appearance getAppearance( )
    void    setGeometry(Geometry app)
    Geometry getGeometry( )
Other Functions:
    void    draw(DrawAction drawer)
    void    draw( )
```

Figure 8:
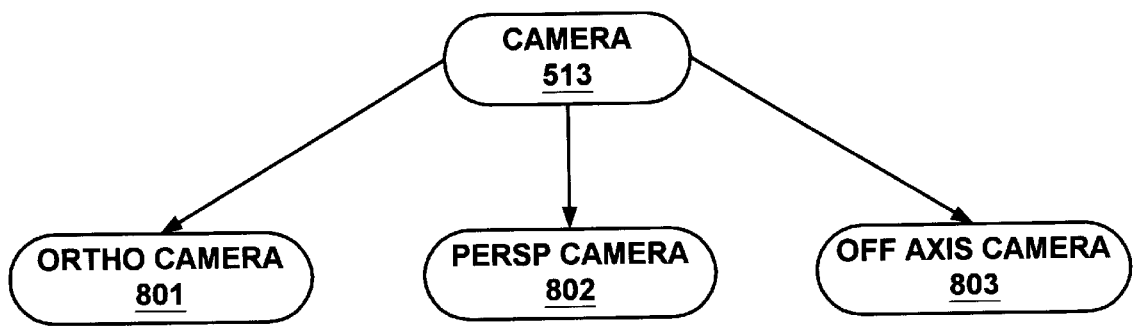
FIG. 8 illustrates the classes associated with the Camera class.

FIG. 8 illustrates the classes associated with the Camera class. In the currently preferred embodiment, the OrthoCamera 801, PerspCamera 802, and OffAxisCamer 803 classes are extensions to Camera class 513. The OrthoCamer class 801 defines an orthographic projection.

```
Fields:
    float   width   1
    float   height  1
    Vec2f   center  0 0
Constructors:
        OrthoCamera( )
    protected OrthoCamera(fieldSpec spec)
Field Sets and Gets:
    void    setWidth(float width)
    float   getWidth( )
    void    setHeight(float height)
    float   getHeight( )
    void    setCenter(Vec2f center)
    void    getCenter(Vec2f center)
The PerspCamera class 802 defines a perspective projection whose
frustum is symmetric.
Fields:
    float   horizFOV    45
    float   vertFOV     45
Constructors:
        PerspCamera( )
    protected PerspCamera(FieldSpec spec)
Field Sets and Gets:
    void    seHorizFOV(float fovv)
    float   getHorizFOV(float fovv)
    void    setVertFOV(float fovv)
        float   getVertFOV(float fovh)
And the OffAxisCamera class 803 defines a perspective projection whose
frustum is possibly asymmetric.
Fields:
    float   width   0.8284271
    float   height  0.8284271
    Vec3f   center  0 0 -1
Constructors:
        OffAxisCamera( )
    protected OffAxisCamera(FieldSpec spec)
Field Sets and Gets:
    void    setWidth(float width)
    float   getWidth( )
    void    setHeight(float height)
    float   getHeight( )
    void    setCenter(Vec3f center)
        void    getCenter(Vec3f center)
```

Figure 9:
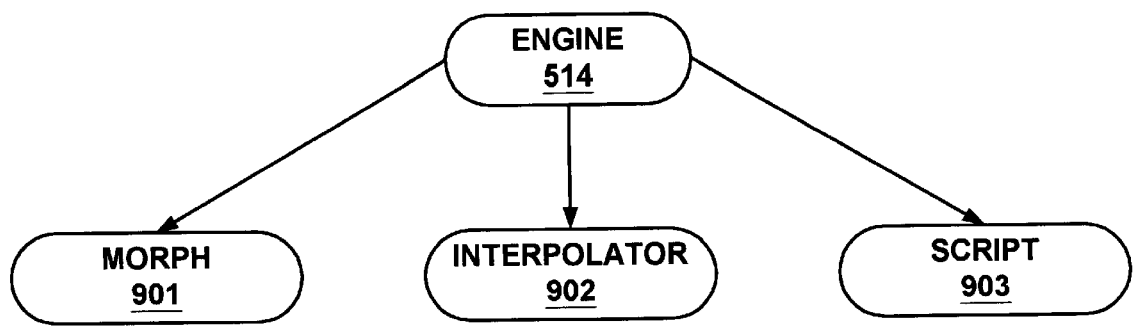
FIG. 9 illustrates the classes associated with the Engine class.

FIG. 9 illustrates the classes associated with the Engine class. In the currently preferred embodiment, there are three classes: Morph 901, Interpolator 902, and Script 903 associated with Engine class 514. Morph class 901 is an Engine which produces a weighted sum of attribute sets. An attribute set is an array of attributes, e.g., a set of Vec3f might represent a set of coordinates. Any number of variably-sized attribute sets are packed into the single, inputVecs field. A separate array, vecOffsets, lists the starting positions of each attribute set in inputVecs. The Morph output is a single array of attributes which may be used as a GeoSet attribute list, for example. An attribute set may have an associated index list which identifies which output attribute is affected by each input attribute.

```
Fields:
    FloatArray weights
    Vec3fArray inputVecs
    IntArray vecOffsets
    IntArray outputIndices
    IntArray indexOffsets
Outputs:
    Vec3fArray outputVecs
Constructors:
        Morph( )
    protected Morph(FieldSpec spec)
Field Sets and Gets:
    void    setWeight(int i, float key)
    float   getWeight(int i)
    int     getWeightCount( )
    void    setInputVec(int i, float x, float y, float z)
    void    getInputVec(int i, Vec3f vec)
    void    getInputCount( )
    void    setVecOffset(int i, int offset)
    int     getVecOffset(int i)
    int     getVecOffsetC ount( )
    void    setOutputIndex(int i, int index)
    int     getOutputIndex(int i)
    int     getOutputIndexCount( )
    void    setIndexOffset(int i, int index)
    int     getIndexOffset(int i)
        int     getIndexOffsetCount( )
```

The Interpolator class 902 interpolates an arbitrary, non-uniform spline and outputs a weight array which defines a weight for each knot, or keyframe, in the spline. Keyframe data (e.g., colors or coordinates), is not kept in the Interpolator so that a single Interpolator can define the animation spline for many keyframe attributes. Keyframe data is typically kept in a Morph 901 node which actually calculates the weighted sum of keyframes to produce the final result. Arbitrary splines of piecewise linear, quadratic, and cubic order are supported. The keys array associates a parametric value with each knot, or keyframe, in the spline. Given an input parametric value, fraction, the Interpolator is evaluated as follows:

1. Find the keys interval which contains the fraction.
2. Normalize the fraction value to range from 0 to 1.
3. Compute the basis function weights from the normalized fraction value.

For example, assume a LINEAR Interpolator with keys=[0.1, 0.3, 0.5, 0.8, 0.9, and 1.0] and a fraction of 0.6:

1. The interval is [key[3], key[4]]
2. The normalized fraction, t=(0.6−0.5)/(0.8−0.5)=0.33
3. Then, weights[ ]=0, weights[1]=0, weights[2]=0, weights[3]=0.66, weights[4]=0.33, weights[5]=0, weights[6]=0

In another example, assume a CUBIC_BSPLINE Interpolator with keys=[0.1, 0.3, 0.5, 0.8, 0.9, and 1.0] and a fraction of 0.6:

1. The interval is [key[2], key[3], key[4], key[5]]
2. The normalized fraction, t=(0.6−0.5)/(0.8−0.5)=0.33
3. Then, weights[0]=0, weights[1]=0, weights[2]=⅙*(−t^3+3t^2−3t+1), weights[3]=⅙*(3t^3−6t^2+4), weights[4]=⅙*(−3t^3+3t^2+3t+1) weights[5]=⅙*t^3, weights[6]=0

```
Fields:
    FloatArray keys
    float       fraction
    Matrix      basisMatrix
Outputs:
    FloatArray weights
Static Data:
    Arguments for makeSpline:
    static final int LINEAR             = 0
    static final int QUADRATIC          = 1
    static final int CUBIC_BSPLINE      = 2
    static final int CUBIC_CATMULL_ROM  = 3
Constructors:
        Interpolator( )
        protected Interpolator(FieldSpec spec)
Field Sets and Gets:
    void    setKey(int i, float key)
    float   getKey(int i)
    Void    setKeyCount(int count)
    int     getKeyCount( )
    void    setFraction(float frac)
    float   getFraction( )
    void    setMatrix(Matrix mat)
    void    getMatrix(Matrix mat)
Other Functions:
    void    makeSpline(int which)
```

The Script class 903 is an engine that is code specific (e.g., Java) and is defined by a file format (e.g., VRML 2.0).

Figure 10:
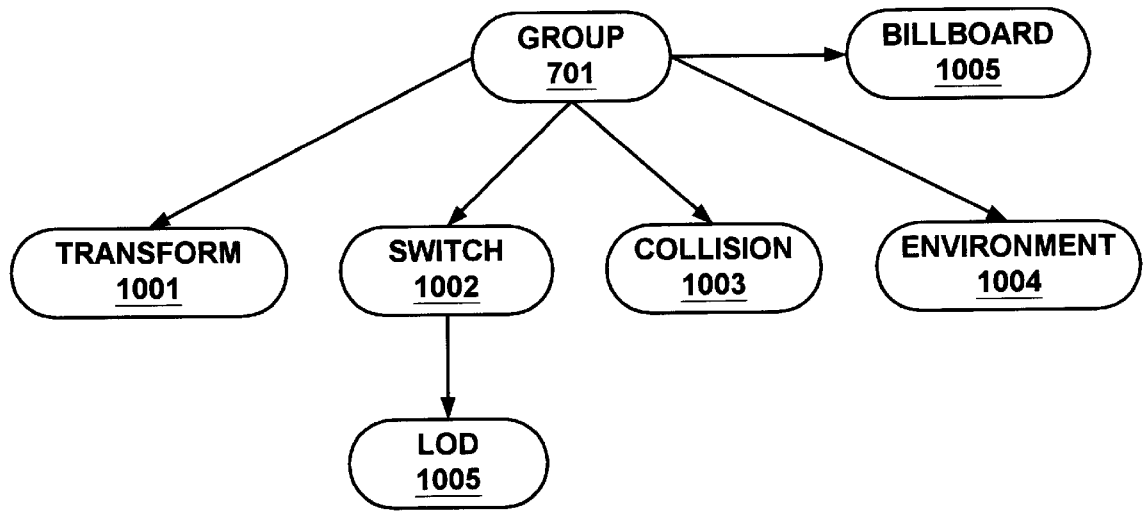
FIG. 10 illustrates the classes associated with the Group class.

FIG. 10 illustrates the classes associated with the Group class 701. In the currently preferred embodiment, the Transform 1001, Switch 1002, Collision 1003, Environment 1004, and Billboard 1005 classes are extensions of Group class 701. More specifically, Transform class 1001 defines a 3D, non-projective, transformation which applies to all its children. The bounding sphere of Transform is that which encompasses all its transformed children.

```
Fields:
    Vec3f translation       0 0 0   (VRML)
    Rotation rotation       0 0 1 0 (VRML)
    float scale             1 1 1   (VRML)
    Rotation scaleOrientation 0 0 1 0 (VRML)
    Vec3f center            0 0 0   (VRML)
    Matrix4f matrix         Identity
Constructors:
        Transform( )
        protected Transform(FieldSpec spec)
Field Sets and Gets:
    void    setTranslation(float x, float y, float z)
    void    getTranslation(Vec3f trans)
    void    setRotation(Rotation rot)
    void    getRotation(Rotation rot)
    void    setRotation(float x, float y, float z, float angle)
    void    getRotation(Vec4f axis)
    void    setScale(float xs, float ys, float zs)
    void    getScale(Vec3f scale)
    void    setScaleOrientation(Rotation rot)
    void    getScaleOrientation(Rotation rot)
    void    setCenter(float x, float y, float z)
    void    getCenter(Vec3f center)
    void    setMatrix(Mafrix4f mat)
    void    getMatrix(Matrix4f mat)
Other Functions:
    void    draw(DrawAction drawer)
        void    draw( )
```

The Switch class 1002 is a Group which selects none, one, or all of its children depending on its value. The switch value is a floating point value in anticipation of future functionality which may blend 2 children based on the fractional value for improved animations or level-of-detail transitions. Switches may inherit their value from an ancestor Switch. This feature is useful for efficiently managing levels-of-detail of an articulated model.

```
Field:
    float value     OFF
Static Data:
    static final int INHERIT = -3
    static final int ON      = -2
    static final int OFF     = -1
Constructors:
        Switch( )
        protected Switch(fieldSpec spec)
Field Sets and Gets:
    void    setValue(float val)
    int     getValue( )
Other Functions:
    void    draw(DrawAction drawer)
```

The Switch class 1002 has an extension, LOD 1005. LOD is short for levels-of-detail and a LOD node is a Switch which selects amongst its children based on its distance from the eyepoint. Level-of-detail is a technique for manipulating model complexity based on image quality and rendering speed. Typically, a model is drawn in finer detail when dose to the viewer (occupies large screen area) than when it is far away (occupies little screen area). In this way, costly detail is drawn only when it can be resolved. The distance to an LOD is defined as the distance from the eyepoint to the (possibly transformed) LOD center. This distance, computed during traversal, selects a child based on the ranges array as follows: no child is selected if ranges[0]>distance or ranges [last]<distance and child "i" is selected when ranges[i] <distance<=ranges[i+1].

```
Fields:
    FloatArray ranges   [ ]     (VRML)
    Vec3f   center      0 0 0   (VRML)
    FloatArray transitions [ ]
Constructors:
        LOD( )
        protected LOD(fieldSpec spec)
Field Sets and Gets:
    void    setRange(int index, float range)
    float   geThe TexTransform subclass 505 RangeCount( )
    void    setTransition(int index, float distance)
    float   getTransition(int index)
    int     getTransitionCount( )
    void    setCenter(Vec3f center)
    void    getCenter(Vec3f center)
Other Functions:
    void    draw(DrawAction drawer)
```

The Collision class 1003 extends Group 701 and provides collision geometry. It has the following fields, constructors, field sets, and gets.

```
Fields:
    boolean collide TRUE (VRML)
    Node    proxy   [ ]     (VRML)
Constructors:
        Collision( )
        protected Collision(FieldSpec spec)
Field Sets and Gets:
    void    setCollide(boolean collide)
    boolean getCollide( )
    void    setProxy(Node proxy)
    Node    getProxy( )
```

The Environment class 1004 is a grouping node which defines the cope of influence for the inherently volumetric effects provided by Light and fog. An Environment group may reference one or more Lights and a single Fog which, by definition, affect all descendants of the Environment which lie within their volumes of influence. Thus, Environments can provide scoping either by scene graph inheritance, by influence volumes, or a combination of the two. For example, a PointLight's influence may be restricted to an office in a building by adding it to the lights array of the Environment which roots the office hierarchy and making the PointLight's influence volume infinite. The scoping provided by the Environment node keeps the PointLight from "leaking" through the office walls into the adjacent hallway. As another example, a SpotLight may be used to simulate the headlights of a moving car. In this case, one could restrict the scope of the SpotLight to a sphere centered around the car so that it doesn't affect the entire world (this would be unrealistic and expensive). This may be accomplished by defining the SpotLight's radius to be on the order of a few hundred feet and adding it to the lights array of the Environment group which roots the entire scene.

```
Fields:
    LightList    lights
    Fog     fog
Constructors:
        Environment( )
        protected Environment(FieldSpec spec)
Field Sets and Gets:
    Light    getLight(int i)
    int      getLightCount( )
    void     addLight(int i, Light light)
    void     removeLight(Light light)
    void     setFog(Fog fog)
    Fog      getFog( )
Other Functions:
    void     draw(DrawAction drawer)
    void     draw( )
```
A Billboard Class 1005 class is used in the construction of billboards as follows.
Description:
    Not finished.
```
Fields:
    Vec3f    axis    0 1 0    (VRML)
    int      align   AXIAL
    Vec3fList positions    [ ]
Static Data:
    static final int AXIAL       = 0
    static final int POINT_SCREEN = 1
    static final int POINT_OBJECT = 2
Constructors:
        Billboard( )
        protected Billboard(FieldSpec spec)
Field Sets and Gets:
    void     setAxis(float x, float y, float z)
    void     getAxis(Vec3f trans)
    void     setAlign(int align)
    int      getAlign( )
    void     setPosition(int index, float x, float y, float z)
    void     getPosition(int index, Vec3f trans)
    void     addPosition(float x, float y, float z)
    void     insertPosition(int index, float x, float y, float z)
    void     replacePosition(int index, float x, float y, float z)
    void     removePosition(int index)
    int      getNumPositions( )
Other Functions:
    void     draw(DrawAction drawer)
```

Figure 11:
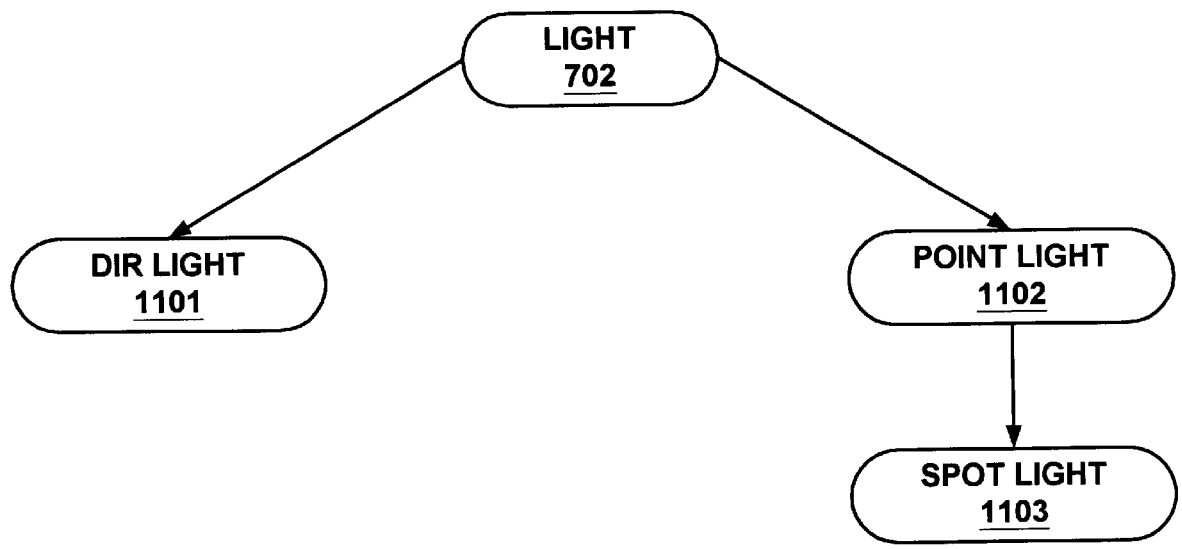
FIG. 11 illustrates the classes associated with the Light class.

FIG. 11 illustrates the classes associated with the Light class 702. DirLight 1101 extends Light 702 and provides a directional light source whose origin is at infinity. Distant light sources such as the sun are reasonably approximated with a DirLight and can improve rendering performance over local light sources such as PointLight and SpotLight. A DirLight has no bound of influence and so affects all children of Environrnents which reference it. A DirLight's direction vector is affected by any Transforms above it in the scene hierarchy.

```
Fields:
    Vec3f direction 0 0 -1 (VRML)
Constructors:
        DirLight( )
        protected DirLight(FieldSpec spec)
Field Sets and Gets:
    void    setDirection(float x, float y, float z)
    void    getDirection(Vec3f dir)
Other Functions:
    void    draw(DrawAction drawer)
        void    draw( )
```

Similarly, Pointlight class 1102 extends Light 702, except that it represents a point light source which radiates equally in all directions. The scope of a PointLight's effect is defined by each Environment group which references the PointLight. All descendants of the Environment which lay within the PointLight's sphere of influence defined by radius and location, are affected by the PointLight. A PointLight's bound (radius+location) is affected by any Transforms above it in the scene hierarchy. A PointLight has no effect unless referenced by an Environment node.

```
Fields:
    Vec3f location 0 0 0 (VRML)
    Float radius   1    (VRML)
    Vec3f attenuation 1 0 0 (VRML)
Constructors:
    PointLight( )
    protected PointLight(FieldSpec spec)
Field Sets and Gets:
    void setLocation(float x, float y, float z)
    void getLocation(Vec3f loc)
    void setRadius(float rad)
    float getRadius( )
    void setAttenuation(float att0, float att1, float att2)
    void getAttenuation(Vec3f att)
Other Functions:
    void draw(DrawAction drawer)
    void draw( )
```

The SpotLight class 1102 extends PointLight class 1102. It represents a conical spot light. The scope of a SpotLight's effect is defined by each Environment group which references the SpotLight. All descendants of the Environment which lay within the SpotLight's sphere of influence defined by radius and location, are affected by the SpotLight. A SpotLight's bound (radius+location) and direction are affected by any Transforms above it in the scene hierarchy. A SpotLight has no effect unless referenced by an Environment node.

```
Fields:
    Vec3f direction 0 0 -1 (VRML)
    Float beamWidth 90 (VRML)
    Float cutOffAngle 45 (VRML)
Constructors:
    SpotLight( )
    protected SpotLight(FieldSpec spec)
Field Sets and Gets:
    void setDirection(float x, float y, float z)
    void getDirection(Vec3f dir)
    void setBeamWidth(float width)
```

-continued

```
    float    getBeamWidth( )
    void     setCutOffAngle(float angle)
    float    getCutOffAngle( )
Other Functions:
    void draw(DrawAction drawer)
        void    draw( )
```

In addition to the classes listed above, there are some basic classes. These include the Data class which is comprised of raw, untyped storage. Applications are expected to subclass Data. The Array class extends Object and has the following characteristics.

```
Elements:
    int     count
Constructors:
    <Array>( )
    <Array>(int count)
Set and Get Functions:
    void     setCount(int count)
    int      getCount( )
    void     set(int i, <ItemType> item)
    <ItemType> get(int i)
    void     setRange(int i, int num, <ItemType> items[ ])
    void     getRange(int i, int num, <ItemType> items[ ])
    void     fillRange(int i, int num, <ItemType> item)
    void     reset( )
    void     copy(<Array> items)
    void     append(<Array> items)
Array Classes:
    <Array>  <ItemType>
    IntArray int
    FloatArrayfloat
```

Furthermore, the List class extends the Array as follows.

```
Constructors:
    <List>( )
    <List>(int count)
Other Functions:
    void     add(<ItemType> item)
    void     insert(int index, <ItemType> item)
    <ItemType> pop( )
    void     push(<ItemType> item)
    int      remove(<ItemType> item)
    void     removeIndex(int i)
    int      orderedRemove(<ItemType> item)
    void     orderedRemoveIndex(int i)
    int      search(<ItemType> item)
List Classes:
    <List>   <ItemType>
    NodeListNode
```

In addition, the IArray class extends class extends the Object object class as follows.

```
Elements:
    short    offset
    short    stride
    int      count
    Data     data
Constructors:
    <IArray>(int count)
    <IArray>(Data data, short offset, short stride)
Set and Get Functions:
    short    getOffset( )
    short    getStride( )
```

-continued

```
    void     setCount(int count)
    int      getCount( )
    void     setData( )
    Data     getData( )
    void     set(int i, <ItemType> item)
    <ItemType> get(int i)
    void     setRange(int i, int num, <ItemType> items[ ])
    void     getRange(int i, int num, <ItemType> items[ ])
Other Functions:
    void     fillRange(int i, int num, <ItemType> item)
    void     reset( )
    void     copy(<IArray> items)
Array Classes:
    <Array>  <ItemType>
    Vec2fIArrayVec2f
    Vec3fIArrayVec3f
    Vec4fIArrayVec4f
    Vec4bIArrayVec4b
    charIArray char
```

The present invention also supports a variety of Math classes: Vec2$f$, Vec3$f$, Vec4$f$,. The Vec2$f$ class extends the Object class as follows.

```
Member Data:
    float vec[2]
Set and Get Functions:
    void     set(float v0, float v1, float v2)
    void     get(float vec[3])
    void     negate(Vec2f vec)
    float    dot(Vec2f vec)
    void     add(Vec2f vec)
    void     sub(Vec2f vec)
    void     scale(float s)
    void     addScaled(float s, Vec2f vec)
    float    sqrDistance(Vec2f pt)
    float    distance(Vec2f pt)
    float    normalize( )
    float    length( )
        void     xform(Matrix4f mat)
```

The Vec3$f$ class class extends Object as follows.

```
Member Data:
    float vec[3]
Set and Get Functions:
    void     set(float v0, float v1, float v2)
    void     get(float vec[3])
    void     negate(Vec3f vec)
    float    dot(Vec3f vec)
    void     add(Vec3f vec)
    void     sub(Vec3f vec)
    void     scale(float s)
    void     addScaled(float s, Vec3f vec)
    float    sqrDistance(Vec3f pt)
    float    distance(Vec3f pt)
    float    normalize( )
    float    length( )
    void     cross(Vec3f vec1)
    void     xformVec(Matrix4f mat)
        void     xformPt(Matrix4f mat)
```

And the Vec4$f$ class extends Object as follows.

```
Member Data:
    float vec[4]
Set and Get Functions:
    void     set(float v0, float v1, float v2)
```

-continued

```
void     get(float vec[3])
void     negate(Vec4f vec)
float    dot(Vec4f vec)
void     add(Vec4f vec)
void     sub(Vec4f vec)
void     scale(float s)
void     addScaled(float s, Vec4f vec)
float    sqrDistance(Vec4f pt)
float    distance(Vec4f pt)
float    normalize( )
float    length( )
     void     xform(Matrix4f mat)
```

Matrix operations are given by the Matrix4$f$ class which extends the Object class as follows.

```
Member Data:
    float mat[16]
Set and Get Functions:
    void     setRow(int row, float x, float y, float z, float w)
    void     getRow(int row, Vec3f dst)
    void     setCol(int col, float x, float y, float z, float w)
    void     getCol(int col, Vec3f dst)
    void     setIdent( )
    void     setRot(Rotation rot)
    void     getRot(Rotation rot)
    void     setEulerRot(float head, float pitch, float roll)
    void     getEulerRot(Vec3f eulers)
    void     setOntoRot(Vec3f vec1, vec3f vec2)
    void     setTrans(float x, float y; float z)
    void     getTrans(Vec3f trans)
    void     setScale(float x, float y, float z)
    void     getScale(Vec3f scale)
    void     transpose(Matrix4f mat)
    void     mult(Matrix4f mat1, Matrix4f mat2)
    void     add(Matrix4f mat)
    void     sub(Matrix4f matX
    void     scale(float s)
    int      invertFull( )
    void     invertAff( )
    void     invertOrtho( )
    void     invertOrthoN( )
    void     invertIdent( )
    void     postMult(Matrix4f mat)
    void     preMult(Matrix4f mat)
    void     preTrans(float x, float y, float z)
    void     postTrans(float x, float y, float z)
    void     preRot(float degrees, float x, float y, float z)
    void     postRot(float degrees, float x, float y, float z)
    void     preScale(float xs, float ys, float zs)
         void     postScale(float xs, float ys, float zs)
```

A Rotation class extends the Object class thusly:

```
Member Data:
    Vec3f axis
        float degrees
```

A Box class extends the Object class thusly:

```
Member Data:
    Vec3f min
    Vec3f max
```

A Sphere class extends the Object class thusly:

```
Member Data:
    Vec3f center
        float radius
```

And a class Frustum extends the Object class.

Figure 12:
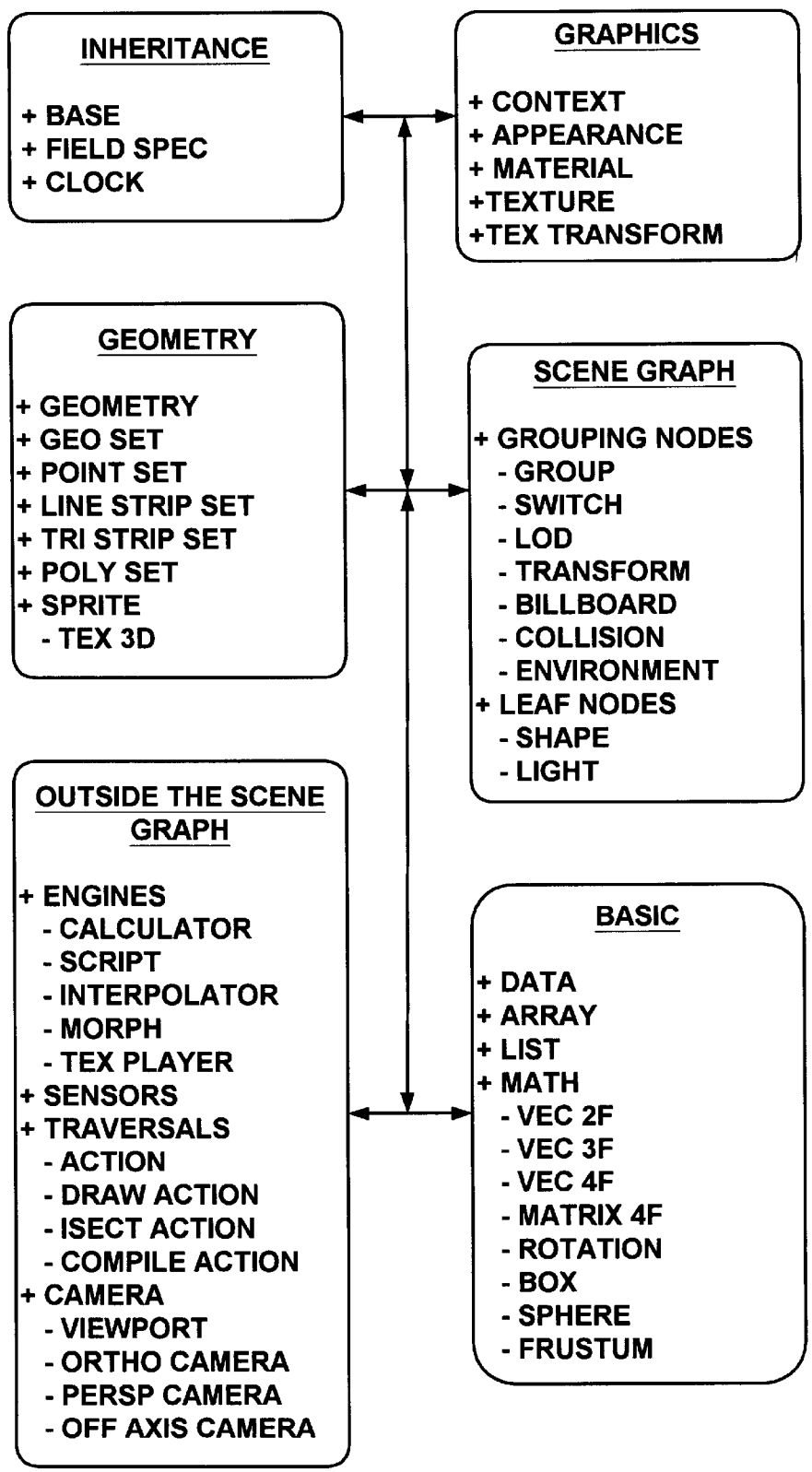
FIG. 12 shows the five general categories of Inheritance, Graphics State, Geometry, Scene Graph, Outside The Scene Graph, and Basic.

Thus, the classes can be broken into the following five general categories: Inheritance, Graphics State, Geometry, Scene Graph, Outside The Scene Graph, and Basic classes, as shown in FIG. 12. The Inheritance category includes the Base, FieldSpec, and Clock classes. The Graphics State includes the Context, Appearance, Material, Texture, and TexTransform classes. The Geometry category includes the Geometry, GeoSet, PointSet, LineStripSet, TriStripSet, PolySet, and Sprite classes. The Sprite class includes a Text3D class. The Scene Graph category includes the Node and Fog classes. The Node class can be broken into Grouping Nodes and Leaf Nodes. The Grouping Nodes include the Group, Switch, LOD, Transform, Billboard, Collision, and Environment classes. The Leaf Nodes include the Shape and Light classes. The Outside The Scene Graph category includes the Engines, Sensors, Traversals, and Camera classes. In turn, the Engines class can be divided into the Calculator, Script, Interpolator, Morph, and TexPlayer classes. The Traversals class is divided into the Action, DrawAction, IsectAction, and CompileAction classes. The Camera class is comprised of the Viewport, OrthoCamera, PerspCamera, and OffAxisCamera classes. Lastly, the Basic category includes the Data, Array, List, and Math classes. There are Vec2$f$, Vec3$f$, Vec4$f$, Matrix4$f$, Rotation, Box, Sphere, and Frustum classes which make up the Math classes.

Figure 13:
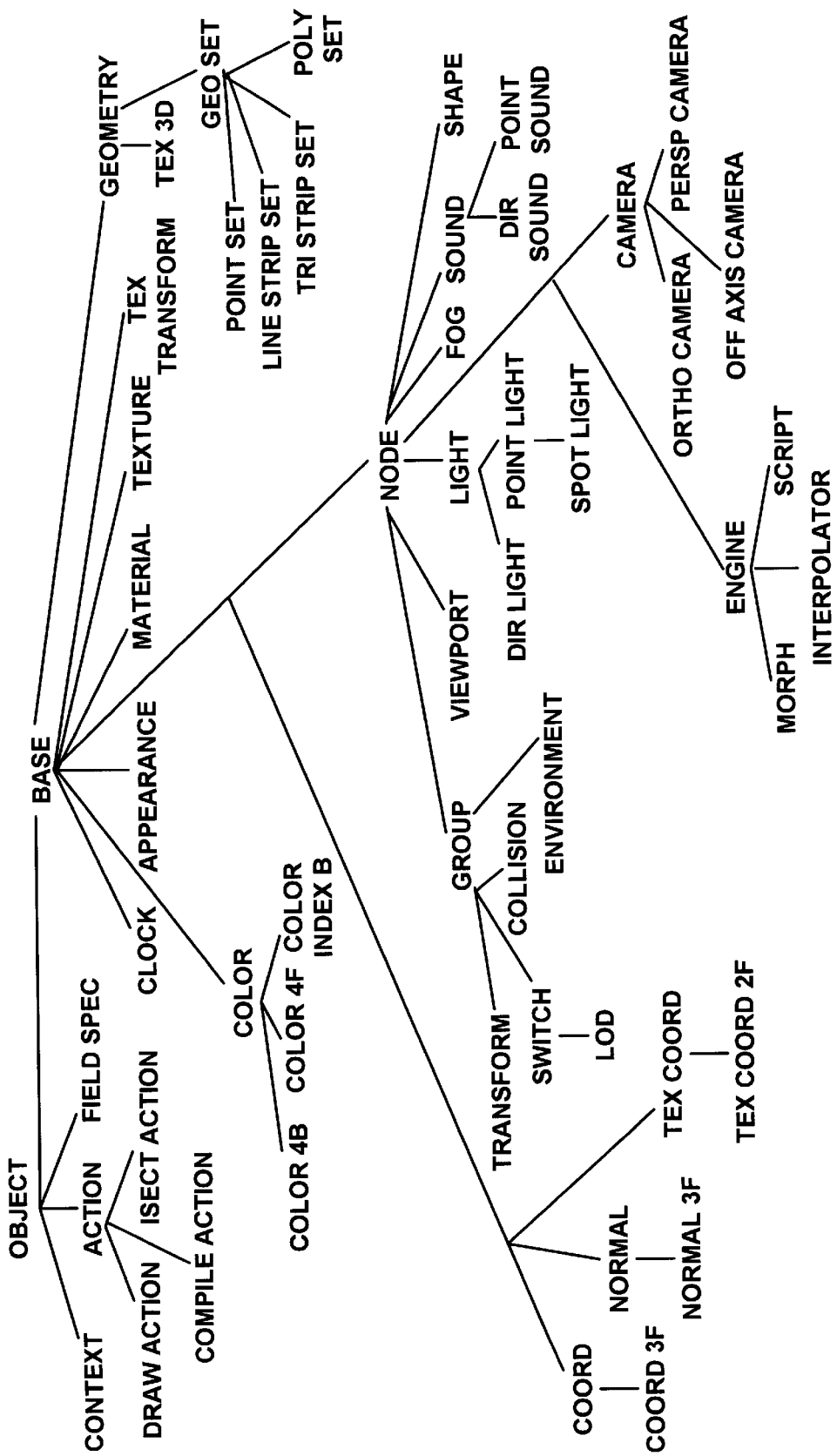
FIG. 13 shows the relationships between each of the different classes, the class hierarchy, and gives a brief description for each class.

In summary, the chart below shows the relationships between each of the different classes, the class hierarchy, and gives a brief description for each class. This chart is also shown in FIG. 13.

```
* Object
    o Context—Current graphics state
    o Action—Abstract - Performs traversals
        + DrawAction—Draws scene
        + IsectAction—Intersects with scene
        + CompileAction—Compiles scene into more efficient data
          structures.
    o FieldSpec—Describes the fields of a Base dass
    o Base—Base class for objects containing fields
        + Clock—Time source
        + Appearance—Graphics state specification
        + Material—Material used for lighting
        + Texture—Texture and parameters
        + TexTransform—Transformation applied to texture coordinates
        + Geometry—Abstract—Geometry for rendering
            + GeoSet—Abstract—Set of like geometric primitives
            + PointSet—Set of points
            + LineStripSet—Set of line strips
            + TriStripSet—Set of triangle strips
            + Polyset—Set of polygons
            + Text3D—Text that can be rendered in 3D
        + Color—Abstract—Color
            + Color4b—4-component color (r,g,b,a) stored as bytes
            + Color4f—4-component color (r,g,b,a) stored as floats
            + ColorIndexb—Color index stored as a byte
        + Coord—Abstract - Coordinate
            + Coord3f—3-component coordinate (x,y,z) stored as
              floats
        + Normal—Abstract—Normal
```

-continued

+ Normal3f—3-component coordinate (x,y,z) stored as floats
+ TexCoord—Abstract—Texture coordinates
  + TexCoord2f—2-component texture coordinate stored as floats
+ Node—Abstract - Scene graph object that can be the child of a group
  + Group—Grouping node; parent class to all nodes internal to scene graph
  + Transform—Transformation node; transforms all of its children
  + Switch—Switching node; only draws selected child or children
    + LOD—Level-of-detail node; selects child to draw based on range
  + Collision—Provides collision geometry
  + Environment - Defines scope of Lights, Fog
  + Light—Abstract—Light that illuminates the scene
  + DirLight—Directional light positioned at infinity
    + PointLight—Light-source with local position and attenuation
    + SpotLight—Light-source with local position that illuminates a conical region
  + Fog—Fog parameters
  + Sound—Abstract—Sound generating node
    + DirSound—Generates a directional sound
    + PointSound—Generates a point sound with a local position
    + Shape—Renderable object; groups a Geometry and an Appearance
  + Viewport—Screen area for rendering
  + Camera—Abstract—Definition of viewing parameters
  + OrthoCamera—Camera using an orthographic projection
  + PerspCamera—Camera using a symmetric viewing frustum
  + OffAxisCamera—Camera using an off-axis perspective frustum
+ Engine—Abstract—Object that processes input fields and generates outputs
  + Morph—Geometric morphing engine for character. animation
  + Interpolator—Interpolator for driving morphs and keyframe animations
  +Script—Engine that uses Java code An example of how to draw water and a brick wall is now presented. The first step is to create and configure the water appearance. This is accomplished by:

Appearance*water=new Appearance;
water.setTranspEnable(1);
water.setTexture(rippleTexture);
water.setMaterial(shinyMaterial);

Likewise, the appearance of the brick wall must be created and configured. This is accomplished by:

Appearance*brick=new Appearance;
brick.setTexture (brickTexture);
brick.setMaterial(dullMaterial);

Next, the global defaults which may be inherited by Appearances is set as follows:

Context.setTranspEnable(0);
Context.setLightEnable(1);
Context.setTexEnable(1);

The above three steps respectively disables the transparency, enables lighting, and enables texturing. Thereupon, the rendering engine is configured with the water appearance, with the LIGHT_ENABLE and TEX_ENABLE inherited from the global state.

water.draw( );

At this point of the program, Context.getTranspEnable( )==1; Context.getLightEnable( )==1; Context.getTexEnable( )==1; Context.getTexture( )==rippleTex; and Context.getMaterial==shinyMaterial. The rendering engine is then configured with the brick appearance, also inheriting LIGHT_ENABLE and TEX_ENABLE from the global state. The global transparency enable value of OFF is automatically restored since 'brick' inherits this state element.

brick. draw( )

At this point of the program, Context.getTranspEnable( )==0; Context.getLightEnable( )==1; Context.getTexEnable( )==1; Context.getTexture( )==brickTex; and Context.getMaterial==dullMaterial. Lastly, the brick wall geometry is drawn.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-readable medium having stored thereon an applications programming interface for causing a computer system to render a three-dimensional scene according to a downloaded file, the applications programming interface comprising:

a plurality of objects, obtained from a Virtual Reality Meta Language (VRML) file downloaded from a network and stored in memory, which are used in constructing a scene graph, the plurality of objects comprising a plurality of hierarchical classes including a top level hierarchy having a context class, an action class, a field spec class, and a base class;

a plurality of subclasses, wherein the action class includes a draw action, a compile action, and an intersect action subclass, the base class includes a clock, color, appearance, node, material, texture, texture transformaton, coordinate, normal, texture coordinate, viewport, camera, engine, and geometry subclass;

a plurality of fields corresponding to the objects, wherein a field is comprised of a data type and represents a state of an object; and a plurality of routes for changing fields in response to changes made to a second field.

2. The computer-readable medium of claim 1, wherein the plurality of objects are comprised of:

a plurality of hierarchical classes including the base class for objects containing fields, the base class having:
  an appearance which specifies a graphics state; and
  a geometry class for specifying a geometry for specifying a geometry for rendering a set of geometric primitives.

3. The computer-readable medium of claim 2, wherein the camera includes a camera using an orthographic projection, a camera using a symmetric viewing frustum, and a camera using an off-axis perspective frustum.

4. The computer-readable medium of claim 2, wherein the set of geometric primitives renderable by the geometry class includes a set of points, a set of independent line segments, a set of line strips, a set of independent triangles, a set of independent quadrilaterals, and a set of triangle strips.

5. The computer-readable medium of claim 4, wherein the geometry class is comprised of a class for generating three-dimensional text.

6. The computer-readable medium of claim 4, wherein the geometry class is further comprised of a sphere primitive and a box primitive.

7. The computer-readable medium of claim 4, wherein the geometry class is further comprised of a cone primitive and a cylinder primitive.

8. The computer-readable medium of claim 2, wherein the base class further comprises:
   a set of coordinates including a three-component coordinate stored as floats;
   a set of normals;
   a set of colors having four-component color stored as bytes and floats;
   a set of texture coordinates; and
   a set of integer indices.

9. The computer-readable medium of claim 2, wherein the base class is further comprised of a node class having:
   a group node;
   a light that illuminates the scene graph;
   fog parameters;
   a sound generating node; and
   a shape renderable object corresponding to the appearance and geometry.

10. The computer-readable medium of claim 9, wherein the group node is comprised of:
    a transformation node for transforming a node;
    a switching node for drawing selected nodes; and
    an environment for defining a scope of the light and fog.

11. The computer-readable medium of claim 9, wherein the group node is further comprised of a collision geometry.

12. The computer-readable medium of claim 2, wherein the appearance class includes the following set and get functions: setInherit(BitMask mask); getInherit(BitMask mask); setTexEnable(boolean texEnable); getTexEnable( ); setTexMode(short texMode); getTexMode( ); setTexture (Texture texture); getTexture( ); setTexTransform (TexTransform texture); getTexTransform( ); setTexBlendColor(Vec4f texBlendColor); getTexBlendColor( ); setTexEnv(short texEnv); getTexEnv( ); setTexGenEnable(boolean texGenEnable); getTexGenEnable( ); setTexGen(TexGen texGen); getTexGen( ); setLightEnable(boolean lightEnable); getLightEnable( ).

13. The computer-readable medium of claim 12, wherein the appearance class further includes the following set and get functions: setMaterial(Material material); getMaterial( ); setShadeModel(short shadeModel); getShadeModel( ); setTranspEnable(boolean transpEnable); getTranspEnable( ); setTranspMode(short transpMode); getTranspMode( ); setFogScale(float fogScale); getFogScale( ); setPolyMode(short polyMode); getPolyMode( ); setAlphaFunc(short alphaFunc); getAlphaFunc( ); setAlphaRef(short alphaRef); getAlphaRef( ); setBlendColor(Vec4f blendColor); getBlendColor( ); setSrcBlendFunc(short srcBlendFunc); getSrcBlendFunc( ); setDstBlendFunc(short dstBlendFunc); getDstBlendFunc( ); setColorMask(int colorMask); getColorMask( ); setDepthFunc(short depthFunc); getDepthFunc( ); setDepthMask(int depthMask); getDepthMask( ).

14. The computer-readable medium of claim 2, wherein the appearance class includes the following fields: inherit, texture, texTransform, texEnable, texMode, texBlendColor, texEnv, texGenEnable, texGen, lightEnable, material, shadeModel, transpEnable, transpMode, fogscale, polyMode, alphaFunc, alphaRef, blendColor, srcBlendFunc, dstBlendFunc, colorMask, depthFunc, and depthMask.

15. The computer-readable medium of claim 2, wherein the appearance class includes the following modes of static data: texture, transparency, polygon, and state element modes.

16. The computer-readable medium of claim 2, wherein the set of geometric primitives renderable by the geometry class further includes a set of polygons.

17. The computer-readable medium of claim 1, further comprising:
    a plurality of engines including at least an interpolator.

18. The computer-readable medium of claim 17, wherein the interpolator includes color, normal, coordinate, orientation, single position, and scalar interpolators.

19. The computer-readable medium of claim 17, wherein the engines are further comprised of:
    a spline evaluator for driving morphs and keyframe animation;
    a geometric morphing engine;
    a geometric transformation engine; and
    a script engine.

20. The computer-readable medium of claim 1, wherein the downloaded file conforms to a VRML file format.

21. The computer-readable medium of claim 1 further comprising a plurality of variables corresponding to the objects, wherein the variables are changed by subroutine calls.

22. The computer-readable medium of claim 1 further comprising a plurality of engines for performing defined functions to the fields.

23. The computer-readable medium of claim 1, wherein the plurality of routes automatically update all corresponding fields in response to a change made to the second field.

24. A computer system having an applications programming interface for displaying a three-dimensional according to a downloaded file, wherein the applications programming interface is comprised of:
    a hierarchy of classes applicable to a Virtual Reality Meta Language (VRML) file downloaded from a network, the hierarchy of classes including:
    a context class;
    an action class;
    a field specification class;
    a base class for objects containing fields, the base class having a color, texture coordinate, normal, node, viewport, camera, engine, a clock, material, texure, texture transformation, an appearance which specifies a graphics state of an object to be displayed, and a geometry class for specifying a geometry for specifying a geometry for rendering a set of geometric primitives.

25. The computer system of claim 24, wherein the hierarchy of classes is further comprised of:
    a set of coordinates;
    a set of normals;
    a set of colors;
    a set of texture coordinates;
    a set of integer indices.

26. The computer system of claim 24, wherein the hierarchy of classes further comprises:
    a viewport corresponding to a screen area for rendering the scene graph;

a camera which defines viewing parameters, wherein the camera includes a camera using an orthographic projection, a camera using a symmetric viewing frustum, and a camera using an off-axis perspective frustum.

27. The computer system of claim 24, wherein the set of geometric primitives renderable by the geometry class includes a set of points, a set of independent line segments, a set of line strips, a set of independent triangles, a set of independent quadrilaterals, and a set of triangle strips.

28. The computer system of claim 27, wherein the geometry class is further comprised of a sphere primitive, and a box primitive.

29. The computer system of claim 27, wherein the geometry class further comprises
a cone primitive and a cylinder primitive.

30. The computer system of claim 27, wherein the geometry class is further comprised of a cone primitive and a cylinder primitive.

31. The computer system of claim 24, wherein the base class further comprises a node class having:
a group node;
a light that illuminates the scene graph;
fog parameters;
a sound generating node; and
a shape renderable object corresponding to the appearance and geometry.

32. The computer system of claim 31, wherein the group node is comprised of:
a transformation node for transforming a node;
a switching node for drawing selected nodes; and
an environment for defining a scope of the light and fog.

33. The computer system of claim 31, wherein the hierarchy of classes further comprises an engine class having at least:
an interpolator.

34. The computer system of claim 33, wherein the interpolator includes color, normal, coordinate, orientation, single position, and scalar interpolators.

35. The computer system of claim 31, wherein the group node is further comprised of a collision geometry.

36. The computer system of claim 24, wherein the appearance class includes the following set and get functions: setInherit(BitMask mask); getInherit(BitMask mask); setTexEnable(boolean texEnable); getTexEnable( ); setTexMode(short texMode); getTexMode( ); setTexture (Texture texture): getTexture( ); setTexTransform (TexTransform texture); getTexTransform( ); setTexBlendColor(Vec4$f$ texBlendColor); getTexBlendColor( ); setTexEnv(short texEnv); getTexEnv( ); setTexGenEnable(boolean texGenEnable); getTexGenEnable( ); setTexGen(TexGen texGen); getTexGen( ); setLightEnable(boolean lightEnable); getLightEnable( ); setMaterial(Material material); getMaterial( ); setShadeModel(short shadeModel); getShadeModel( ); setTranspEnable(boolean transpEnable); getTranspEnable( ); setTranspMode(short transpMode); getTranspMode( ); setFogScale(float fogScale); getFogScale( ); setPolyMode(short polyMode); getPolyMode( ); setAlphaFunc(short alphaFunc); getAlphaFunc( ); setAlphaRef(short alphaRef); getAlphaRef( ); setBlendColor(Vec4$f$ blendColor); getBlendColor( ); setSrcBlendFunc(short srcBlendFunc); getSrcBlendFunc( ); setDstBlendFunc(short dstBlendFunc); getDstBlendFunc( ); setColorMask(int colorMask); getColorMask( ); setDepthFunc(short depthFunc); getDepthFunc( ); setDepthMask(int depthMask); and getDepthMask( ).

37. The computer system of claim 24, wherein the appearance class includes the following fields: inherit, texture, texTransform, texEnable, texMode, texBlendColor, texEnv, texGenEnable, texGen, lightEnable, material, shadeModel, transpEnable, transpMode, fogScale, polyMode, alphaFunc, alphaRef, blendColor, srcBlendFunc, dstBlendFunc, colorMask, depthFunc, and depthMask.

38. The computer system of claim 24, wherein the set of geometric primitives renderable by the geometry class further includes a set of polygons.

39. The computer system of claim 24, wherein the engine class is further comprised of:
a spline evaluator for driving morphs and keyframe animation;
a geometric morphing engine;
a geometric transformation engine; and
a script engine.

40. A computer system having an applications programming interface for displaying a three-dimensional scene according to a downloaded file, wherein the applications programming interface is comprised of:
a hierarchy of classes applicable to a Virtual Reality Meta Language (VRML) file downloaded from a network having a top level class including a context, action, field specification, and base class, wherein the base class includes a clock, appearance, material, texture, texture transform, geometry, color, coordinate, normal, texture coordinate, node, viewport, camera, and
a plurality of engines including a geometric morphing engine, an interpolator engine, and a script engine.

41. The computer system of claim 40, wherein the morphing engine is comprised of weights, inputVecs, vecOffsets, outputindices, indexOffsets fields.

42. The computer system of claim 40, wherein the morphing engine is comprised of an outputVecs ouput.

43. The computer system of claim 40, wherein the morphing engine is comprised of a Morph( ) and Morph (FieldSpec spec) constructors.

44. The computer system of claim 40, wherein the morphing engine is comprised of the following field sets and gets:
void setweight(int i, float key);
float getweight(int i);
int getWeightCount( );
void setInputVec(int i, float x, float y, float z);
void getInputvec(int i, Vec3$f$ vec);
void getInputCount( );
void setVecOffset(int i, int offset);
int getVecOffset(int i);
int getVecOffsetCount( );
void setOutputIndex(int i, int index);
int getOutputIndex(int i);
int getOutputIndexCount( );
void setIndexOffset(int i, int index)
int getIndexOffset(int i)
int getIndexOffsetCount( ).

45. A computer system having an applications programming interface for displaying a three-dimensional according to a downloaded file, wherein the applications programming interface is comprised of:

a hierarchy of classes applicable to a Virtual Reality Meta Language (VRML) file downloaded from a network, the hierarchy of classes including a context class, an action class, a field spectication class, a base class having a geometry subclass including a sprite subclass, a texture 3D subclass, and a geoset subclass for specifying a geometry for rendering a set of geometric primitives including:

a point set;

a line strip set;

a tristrp set;

a polygon set.

46. The computer system of claim 45, wherein the geometry class is further comprised of a sphere primitive, and a box primitive.

47. The computer system of claim 46, wherein the hierarchy of classes further comprises:

a base class having:
  a set of coordinates including a three-component coordinate stored as floats;
  a set of normals;
  a set of colors having four-component color stored as bytes and floats;
  a set of texture coordinates; and
  a set of integer indices.

48. The computer system of claim 45, wherein the hierarchy of classes further includes:

a base class having a node class that includes:
  a group node;
  a light that illuminates the scene graph;
  fog parameters;
  a sound generating node; and
  a shape renderable object corresponding to the appearance and geometry.

49. The computer system of claim 48, wherein the group node is comprised of:

a transformation node for transforming a node;

a switching node for drawing selected nodes; and an environment for defining a scope of the light and fog.

50. The computer system of claim 48, wherein the group node is further comprised of a collision geometry.

51. The computer system of claim 45 further comprising a geoset having cullFace, primCount, colors, normals, texCoords, coords, colorindices, normalindices, texCoordIndices, coordindices, colorBind, normalBind, and texCoordBind fields.

52. The computer system of claim 45 further comprising a geoset having static data representing a cull face corresponding to none, front, back and both conditions and static data representing binding conditions corresponding to off, overall, primitive, and vertex.

53. The computer system of claim 45 further comprising a geoset having the following field sets and gets: setBound (Box bound); getBound(Box bound); setCullFace(int cf); getCullFace( ); setPrimCount(int np); getPrimCount( ); setColorBind(char b); getColorBind( ); setNormalBind(char b); getNormalBind( ); setTexCoordBind(char b); getTexCoordBind( ); setColors(Color c); getColors( ); setNormals(Normal c); getNormals( ); setTexCoords (TexCoord c); getTexCoords( ); setCoords(Coord *c); getcoords( ); setColorIndices(Index c); getColorIndices( ); setNormalIndices(Index c); getNormalIndices( ); setTexCoordIndices(Index c); getTexCoordIndices( ); setCoordIndices(Index c); getCoordIndices( ).

54. The computer system of claim 45 wherein the set of geometric primitives further includes a set of polygons.

55. The computer system of claim 45, wherein the geometry class is further comprised of a cone primitive and a cylinder primitive.

* * * * *